(12) United States Patent
Woo et al.

(10) Patent No.: US 12,174,749 B2
(45) Date of Patent: Dec. 24, 2024

(54) PAGE TABLE MANAGER

(71) Applicant: Rambus Inc., San Jose, CA (US)

(72) Inventors: Steven C. Woo, Saratoga, CA (US);
Christopher Haywood, Cary, NC (US);
Evan Lawrence Erickson, Chapel Hill, NC (US)

(73) Assignee: Rambus Inc., San Jose, CA (US)

( * ) Notice: Subject to any disclaimer, the term of this patent is extended or adjusted under 35 U.S.C. 154(b) by 2 days.

(21) Appl. No.: 17/576,398

(22) Filed: Jan. 14, 2022

(65) Prior Publication Data

US 2022/0237126 A1 Jul. 28, 2022

Related U.S. Application Data

(60) Provisional application No. 63/142,130, filed on Jan. 27, 2021.

(51) Int. Cl.
| | | |
|---|---|---|
| *G06F 12/10* | (2016.01) | |
| *G06F 9/455* | (2018.01) | |
| *G06F 12/02* | (2006.01) | |
| *G06F 12/0882* | (2016.01) | |
| *G06F 12/1009* | (2016.01) | |

(52) U.S. Cl.
CPC ...... *G06F 12/1009* (2013.01); *G06F 9/45558* (2013.01); *G06F 12/0238* (2013.01); *G06F 12/0882* (2013.01); *G06F 2009/45583* (2013.01); *G06F 2212/7201* (2013.01)

(58) Field of Classification Search
CPC ......... G06F 12/1009; G06F 2212/7201; G06F 9/45558; G06F 12/0238; G06F 2009/45583; G06F 12/0882; G06F 2212/654; G06F 2212/681; G06F 2212/684; G06F 12/1036; G06F 2212/151; G06F 2212/651
USPC .......................................................... 711/154
See application file for complete search history.

(56) References Cited

U.S. PATENT DOCUMENTS

| | | |
|---|---|---|
| 8,060,722 B2 | 11/2011 | Adams et al. |
| 8,078,827 B2 | 12/2011 | Uhlig et al. |
| 8,392,628 B2 | 3/2013 | Santos et al. |
| (Continued) | | |

OTHER PUBLICATIONS

Intel, "PCI-SIG SR-IOV Primer, An Introduction to SR-IOV Technology", Intel LAN Access Division. 321211-002, Revision 2.5, Jan. 2011. Downloaded at: https://www.intel.com/content/www/us/en/pci-express/pci-sig-sr-lov-primer-sr-lov-technology-paper.html. 28 pages.

*Primary Examiner* — Hua J Song
(74) *Attorney, Agent, or Firm* — The Neudeck Law Firm, LLC

(57) ABSTRACT

The creation, maintenance, and accessing of page tables is done by a virtual machine monitor running on a computing system rather than the guest operating systems. This allows page table walks to be completed in fewer memory accesses when compared to the guest operating system's maintenance of the page tables. In addition, the virtual machine monitor may utilize additional resources to offload page table access and maintenance functions from the CPU to another device, such as a page table management device or page table management node. Offloading some or all page table access and maintenance functions to a specialized device or node enables the CPU to perform other tasks during page table walks and/or other page table maintenance functions.

17 Claims, 19 Drawing Sheets

(56) References Cited

U.S. PATENT DOCUMENTS

| | | |
|---|---|---|
| 9,424,199 B2 | 8/2016 | Kegel et al. |
| 2017/0220466 A1 | 8/2017 | Gupta et al. |
| 2018/0081830 A1* | 3/2018 | Kaplan ............... G06F 12/1483 |
| 2019/0026231 A1 | 1/2019 | Kotlilingal et al. |
| 2019/0391927 A1* | 12/2019 | Tsirkin ................. G06F 12/145 |
| 2021/0406199 A1* | 12/2021 | Kounavis ............. G06F 12/063 |

\* cited by examiner

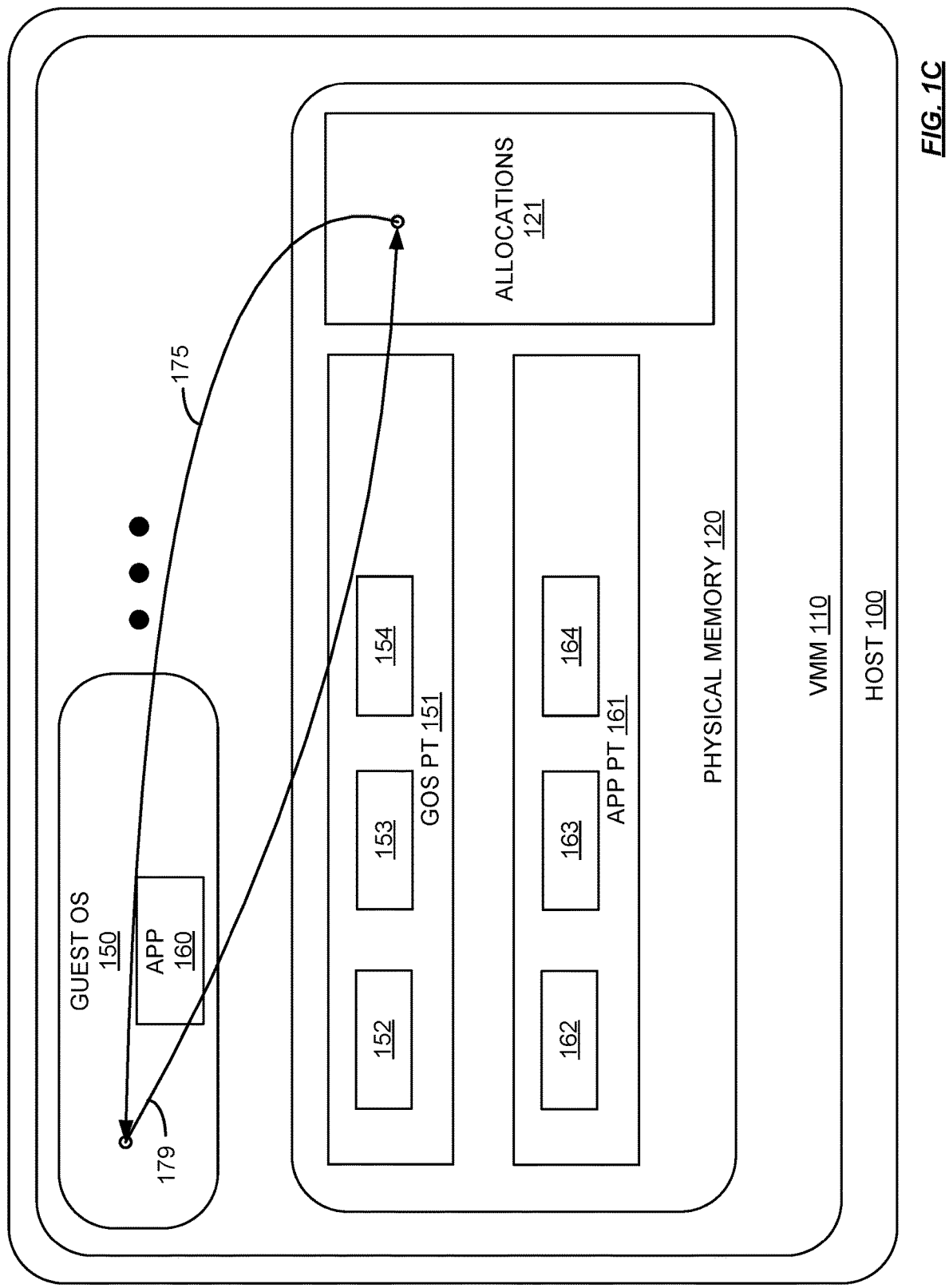

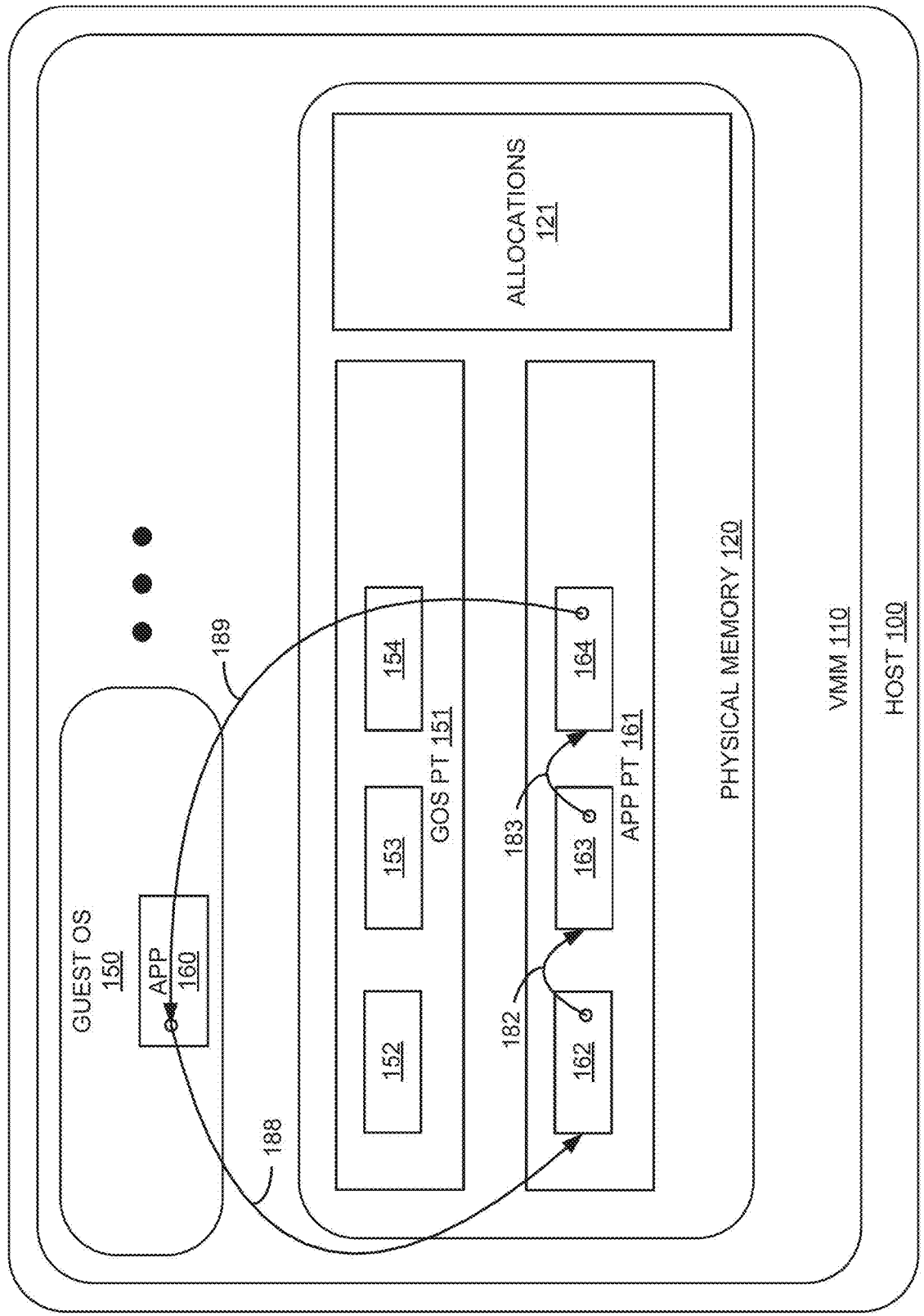

RECEIVE, VIA A FIRST INTERFACE AND FROM A REMOTE PROCESSOR EXECUTING A VIRTUAL MACHINE MANAGER, A REQUEST TO CONVERT A VIRTUAL ADDRESS TO A PHYSICAL ADDRESS
802

IN RESPONSE TO THE REQUEST, WALKING A PAGE TABLE STORED IN A MEMORY.
804

*FIG. 8*

```
┌─────────────────────────────────────────────────────────┐
│  RECEIVE, BY A VIRTUAL MEMORY MANAGER EXECUTING ON A    │
│  LOCAL PROCESSOR, A COMMAND TO TRANSLATE A VIRTUAL      │
│          ADDRESS TO A PHYSICAL ADDRESS                  │
│                        1002                             │
└─────────────────────────────────────────────────────────┘
                            │
┌─────────────────────────────────────────────────────────┐
│    TRANSMIT, BY THE VIRTUAL MEMORY MANAGER AND TO A     │
│  REMOTE PAGE TABLE MANAGEMENT DEVICE , A REQUEST TO     │
│  TRANSLATE THE VIRTUAL ADDRESS TO A PHYSICAL ADDRESS    │
│                        1004                             │
└─────────────────────────────────────────────────────────┘
                            │
┌─────────────────────────────────────────────────────────┐
│  RECEIVE, BY THE VIRTUAL MEMORY MANAGER AND FROM THE    │
│   REMOTE PAGE TABLE MANAGEMENT DEVICE, THE PHYSICAL     │
│     ADDRESS ASSOCIATED WITH THE VIRTUAL ADDRESS         │
│                        1006                             │
└─────────────────────────────────────────────────────────┘
                            │
┌─────────────────────────────────────────────────────────┐
│    PROVIDE, BY THE VIRTUAL MEMORY MANAGER AND TO THE    │
│ LOCAL PROCESSOR, THE PHYSICAL ADDRESS ASSOCIATED WITH   │
│                   THE VIRTUAL ADDRESS                   │
│                        1008                             │
└─────────────────────────────────────────────────────────┘
```

*FIG. 10*

PAGE TABLE MANAGER

BRIEF DESCRIPTION OF THE DRAWINGS

FIGS. 1A-1D are notional illustrations of a system with managed page tables.

FIG. 8 is a flowchart illustrating a method of remote page table walking.

FIG. 10 is a flowchart illustrating a method of operating a virtual machine manager.

DETAILED DESCRIPTION OF THE EMBODIMENTS

Figure 1A:
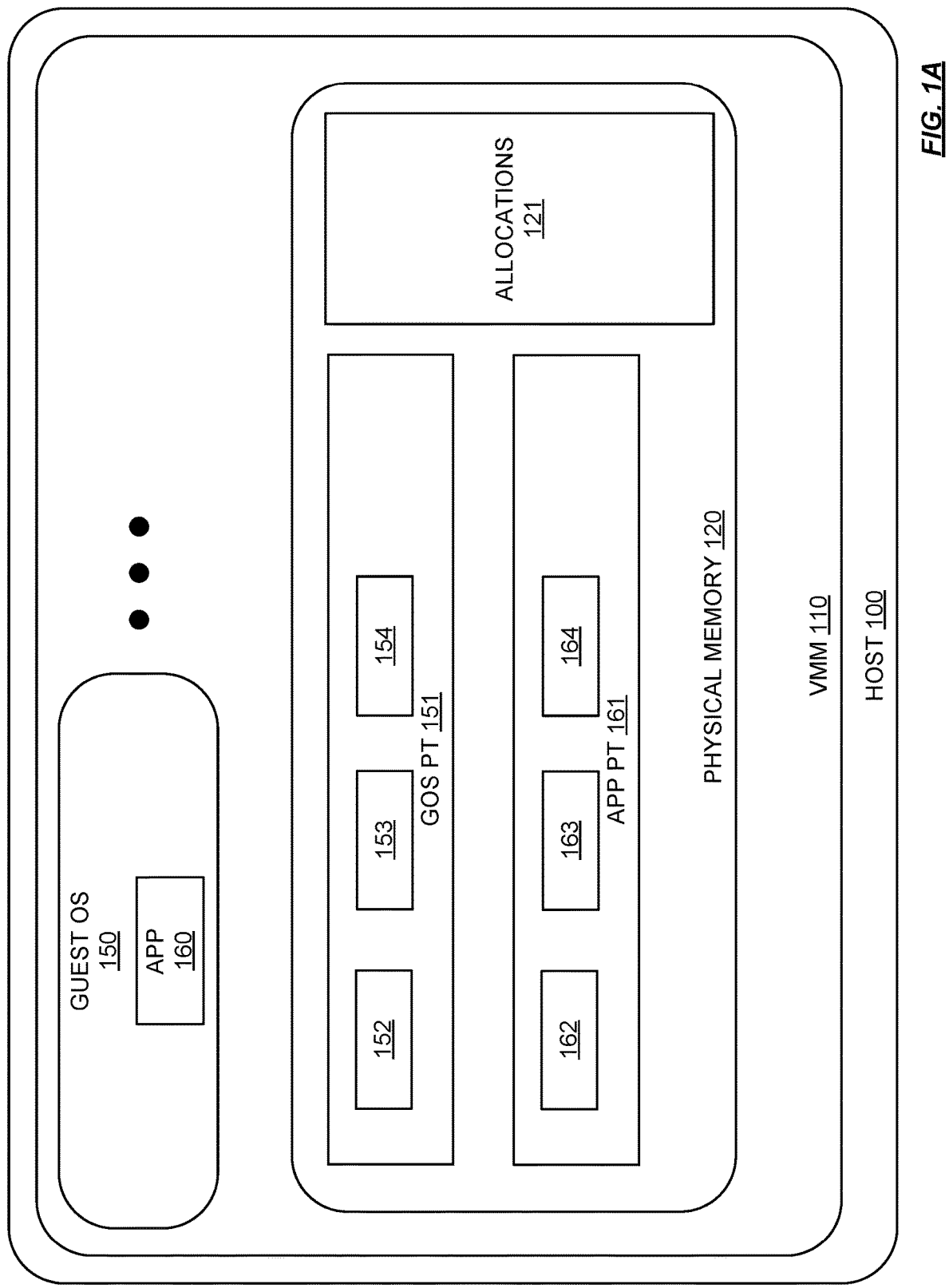

Many modern computing systems implement the concept of "virtual memory." Virtual memory allows the address space as seen by a process to appear as a single, large, and contiguous address space when in actuality, the physical locations of data accessed by the process may be fragmented, segmented, smaller in size than the virtual address space, and/or stored in different types of storage (e.g., paged to disk.) These computing systems may maintain one or more page tables to translate virtual memory addresses used by processes to physical memory addresses in physical memory devices. Each process may have its own page table where the operating system is responsible for managing (e.g., creating, updating, deleting) these page tables. The operating system may control system resources (e.g., dynamic random access memory—DRAM) and determine how much memory each processes is allowed to use at any given time. The page tables may map portions of each processes virtual address space to the physical memory the process has been allocated. In this manner, many processes may be executing at the same time, each of which is using only a portion of physical memory.

Virtual machines (VMs) allow multiple operating systems to be run simultaneously on the same computer hardware. This allows the sharing of the underlying physical machine resources (e.g., memory, I/O, etc.) between multiple operating systems (or instances of the same operating system), thereby improving resource utilization. Virtual machines facilitate application provisioning, maintenance, high availability, and disaster recovery. The software layer providing the virtualization is typically called a virtual machine monitor (VMM) or hypervisor. The VMM is typically responsible for managing and allocating resources to the VMs.

In an embodiment, a VMM and/or its virtual machines may be operated in a first mode. Each virtual machine (VM) runs an operating system (called a "guest operating system" or guest OS) and is allocated a subset of the system resources by the VMM to be used by the guest OS. In this first mode, when mapping a virtual address for a process in a VM (called a "guest virtual address" or guest VA) to a physical memory address in physical memory, the guest OS may translate the guest VA to a "guest physical address" (a.k.a., guest PA) using the guest OS managed page tables. The guest PA is then mapped to a physical machine address (called a "host physical address," or host PA) by the hypervisor, which uses another set of page tables to accomplish this task. This may be referred to as a "2-dimensional page table walk", "nested paging", or "second level address translation" (SLAT). Nested paging has the advantage that, in many instances, the guest OS may be unmodified when compared to guest OS versions running on non-virtualized systems.

In some situations, using two sets of page tables to translate a guest VA to a host PA may be suboptimal in terms of the number of memory accesses performed. For example, some modern virtual machine system architectures may require as many as 35 memory accesses to translate a single guest VA to a single host PA. This is seven times the number of memory accesses performed by a system that is not implementing one or more virtual machines (because a system not implementing virtual machines may use 1-dimensional page table walks). Further, the memory accesses associated with a 2-dimensional page table walk happen serially because each page-table lookup memory access needs to complete before the next one can be issued. This makes the page table walking process limited by memory latency, which is relatively slow when compared to the execution speed of processors.

In a second mode, the creation, maintenance, and accessing of page tables is done by the virtual machine monitor rather than the guest operating system. This allows 1-dimensional page table walks, which, as discussed herein, can be completed using fewer memory accesses when compared to the guest operating system's maintenance of the page tables. In addition, the virtual machine monitor may utilize additional resources to offload page table access and maintenance functions from the CPU to another device, such as a page table management device or page table management node (e.g., a dedicated server, system, system component, mesh component, fabric component, system on a chip, and/or integrated circuit or circuits included therein) in a multi-processing network topology (e.g., a mesh, or a fabric). Offloading some or all page table access and maintenance functions to a specialized device or node enables the CPU to perform other tasks during page table walks and/or other page table maintenance functions. In addition, when the specialized device includes memory for holding the page table information, offloading may reduce contention for the memory system of the CPU. In other words, by having page table memory accesses on another device, the processes running on the CPU don't have to contend with, or wait for, the page table accesses to the CPU's memory.

In an embodiment, a system may implement the second mode without implementing the first mode. In another embodiment, a system may operate substantially in the second mode. For example, a system may operate in the second mode except during certain times that do not constitute a majority (or even, for example, 10%) of the time the system is operating. In other words, a system may operate in the second mode except for a limited time of operation in the first mode during certain activities such as, but not limited to: bootup, shutdown, VM instantiation, VM teardown, saving VM state, system maintenance, system testing, debug, etc.

FIGS. 1A-1D are notional illustrations of a system with managed page tables. In FIGS. 1A-1D, host system 100 executes virtual machine manager (VMM) 110. VMM 110 controls/provisions physical memory 120 and provides an environment to at least one guest operating system 150. Guest operating system 150 may execute at least one application 160.

VMM 110 creates, modifies, and accesses guest operating system page table 151 and application page table 161 in physical memory 120. VMM 110 also creates and modifies memory allocations 121 in physical memory 120. Guest operating system page table 151 may be created, modified, and/or accessed by the VMM 110 in coordination with guest operating system 150. Guest operating system page table 151 may be created, modified, and/or accessed by the VMM 110 on behalf of guest operating system 150. Guest operating system page table 151 translates virtual addresses used by guest operating system 150 into physical addresses in physical memory 120 that are used by host system. Application page table 161 translates virtual addresses used by application 160 into physical addresses in physical memory 120 that are used by host system. Guest operating system page table 151 includes first level page table entry 152, second level page table entry 153, and last level page table entry 154. Application page table 161 includes first level page table entry 162, second level page table entry 163, and last level page table entry 164.

It should be understood that the three levels of page table entries illustrated in FIGS. 1A-1D is merely an example number of levels used to illustrate the functioning of multi-level page table systems. Systems may have any number of levels of page table entries. For example, recent CPUs have as many as five levels. It is expected that future systems may have more than five levels. It should also be understood that the number of guest operating systems, guest operating system page tables 151, applications, and application page tables 161 are also merely examples for illustration purposes. Any number of additional guest operating systems, guest operating system page tables 151, applications, and application page tables 161 are contemplated.

Figure 1B:
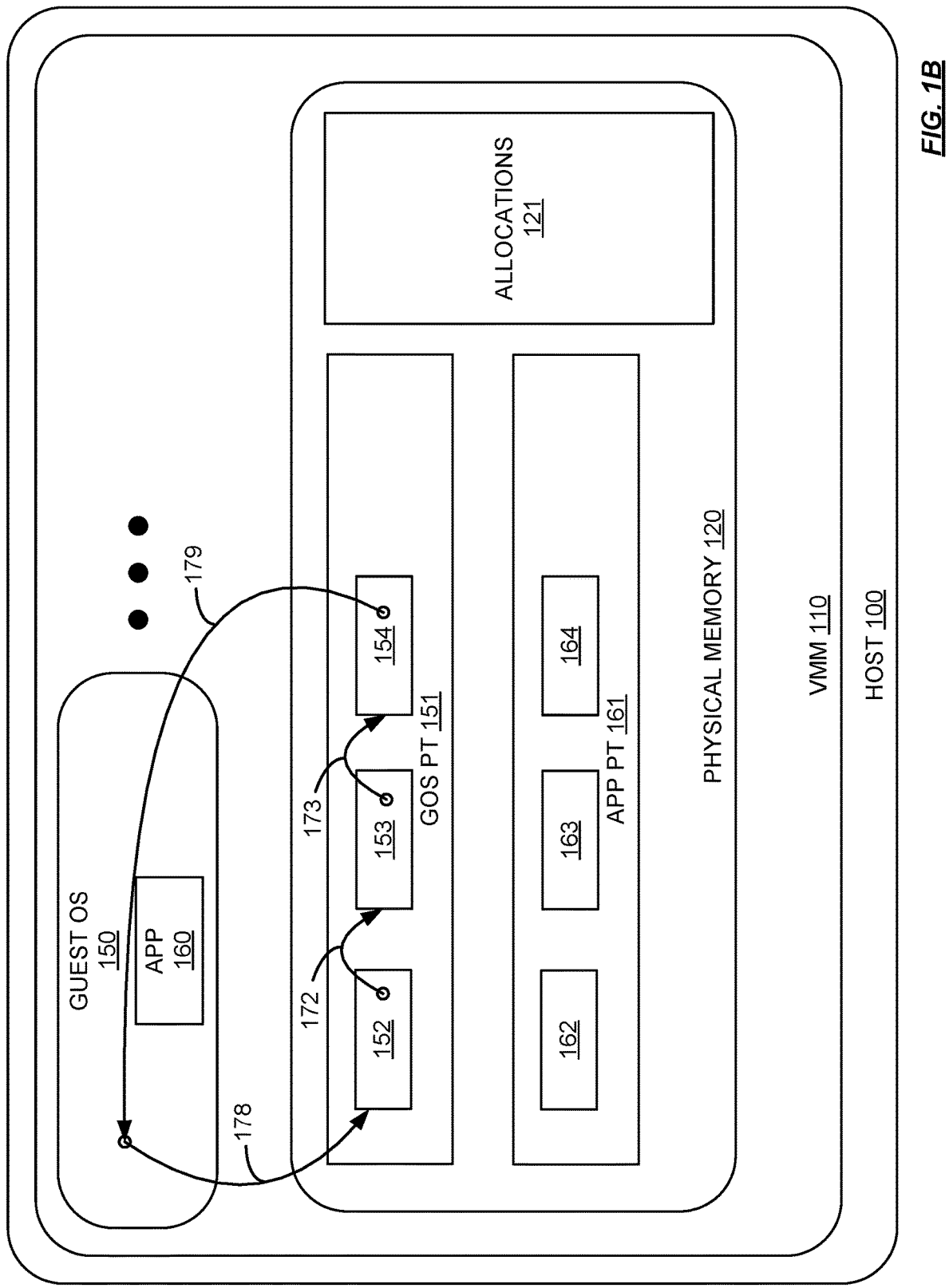

Host system is configured by guest operating system 150 and/or VMM 110 to, when guest operating system 150 accesses a virtual address 171 that requires translation into a physical address, to walk guest operating system page table 151 to receive a physical address 174 in physical memory 120 corresponding to the virtual address 171 requiring the translation. This is illustrated in FIG. 1B by: virtual address 171 arrow running from guest operating system to first level page table entry 152; referencing arrow 172 running from first level page table entry 152 to second level page table entry 153; referencing arrow 173 running from second level page table entry 153 to last level page table entry 154; and, physical address 174 arrow running from last level page table entry 154 back to virtual address 171 arrow originating from a location in guest operating system 150.

After receiving physical address 174 and restarting the execution of guest operating system 150, host system accesses the location in allocations 121 addressed by physical address 174. Physical memory 120 returns the data stored at physical address 174 to be used by guest operating system 150. This is illustrated in FIG. 1C by physical address 174 arrow running from guest operating system 150 to a location in allocations 121 and data 175 arrow running from allocations 121 back to guest operating system 150.

Host system is also configured by guest operating system 150 and/or VMM 110 to, when application 160 accesses a virtual address 181 that requires translation into a physical address, to walk application page table 161 to receive a physical address 184 in physical memory 120 corresponding to the virtual address 181 requiring the translation. This is illustrated in FIG. 1D by: virtual address 181 arrow running from guest operating system to first level page table entry 162; referencing arrow 182 running from first level page table entry 162 to second level page table entry 163; referencing arrow 183 running from second level page table entry 163 to last level page table entry 164; and, physical address 184 arrow running from last level page table entry 164 back to virtual address 181 arrow originating from a location in guest operating system 150.

Figure 2A:
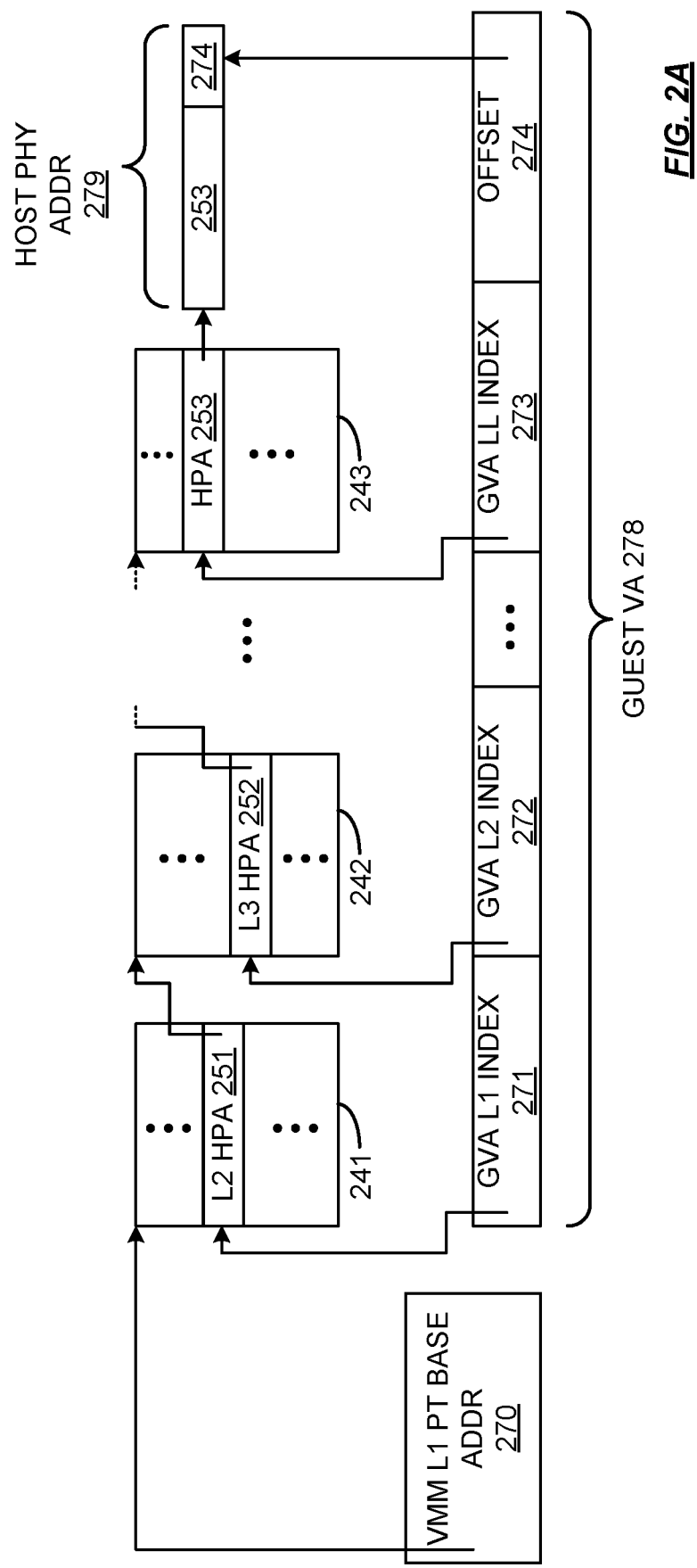
FIGS. 2A-2C illustrate managed and nested page table walks.
Figure 2B:
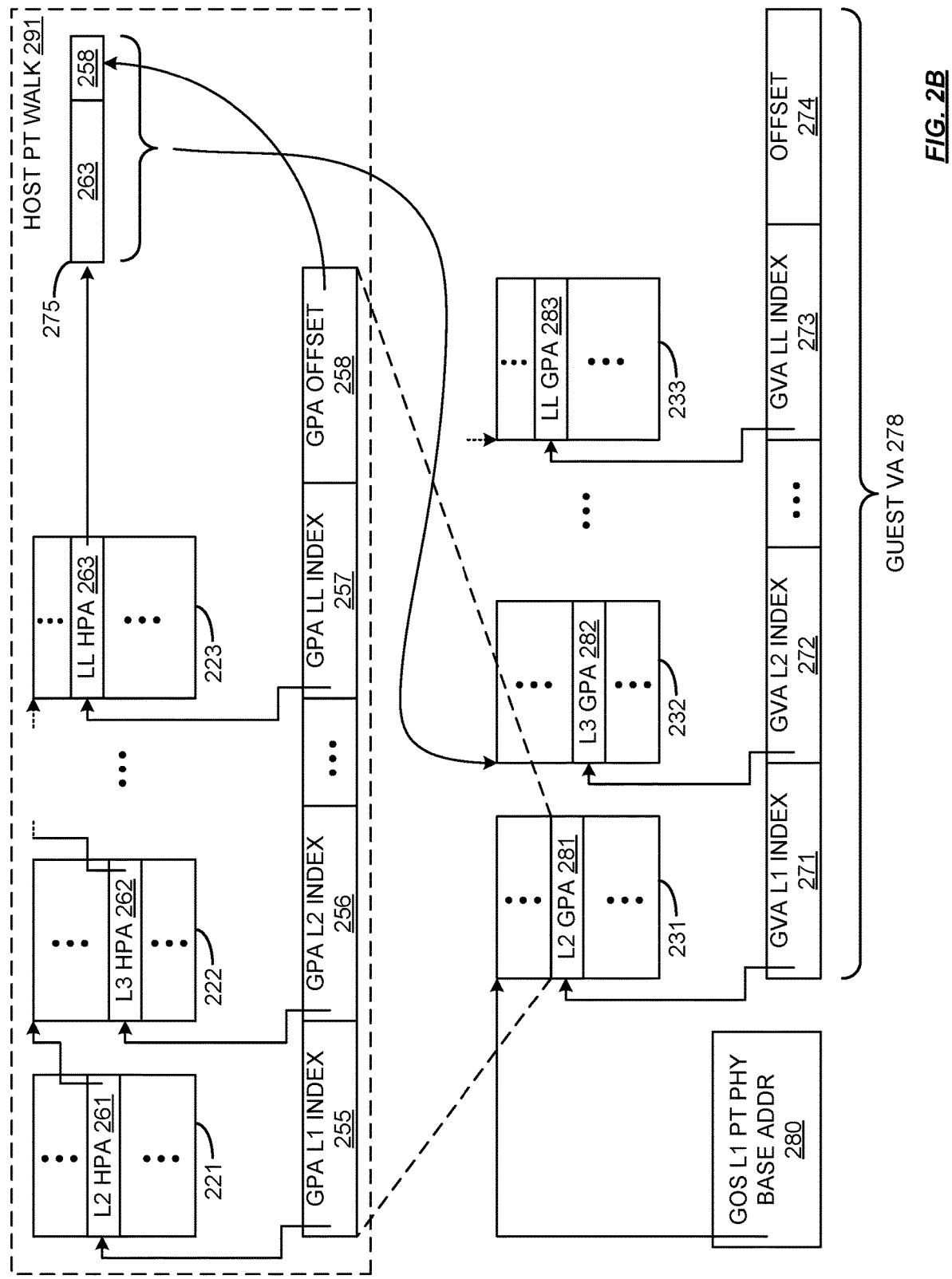
Figure 2C:
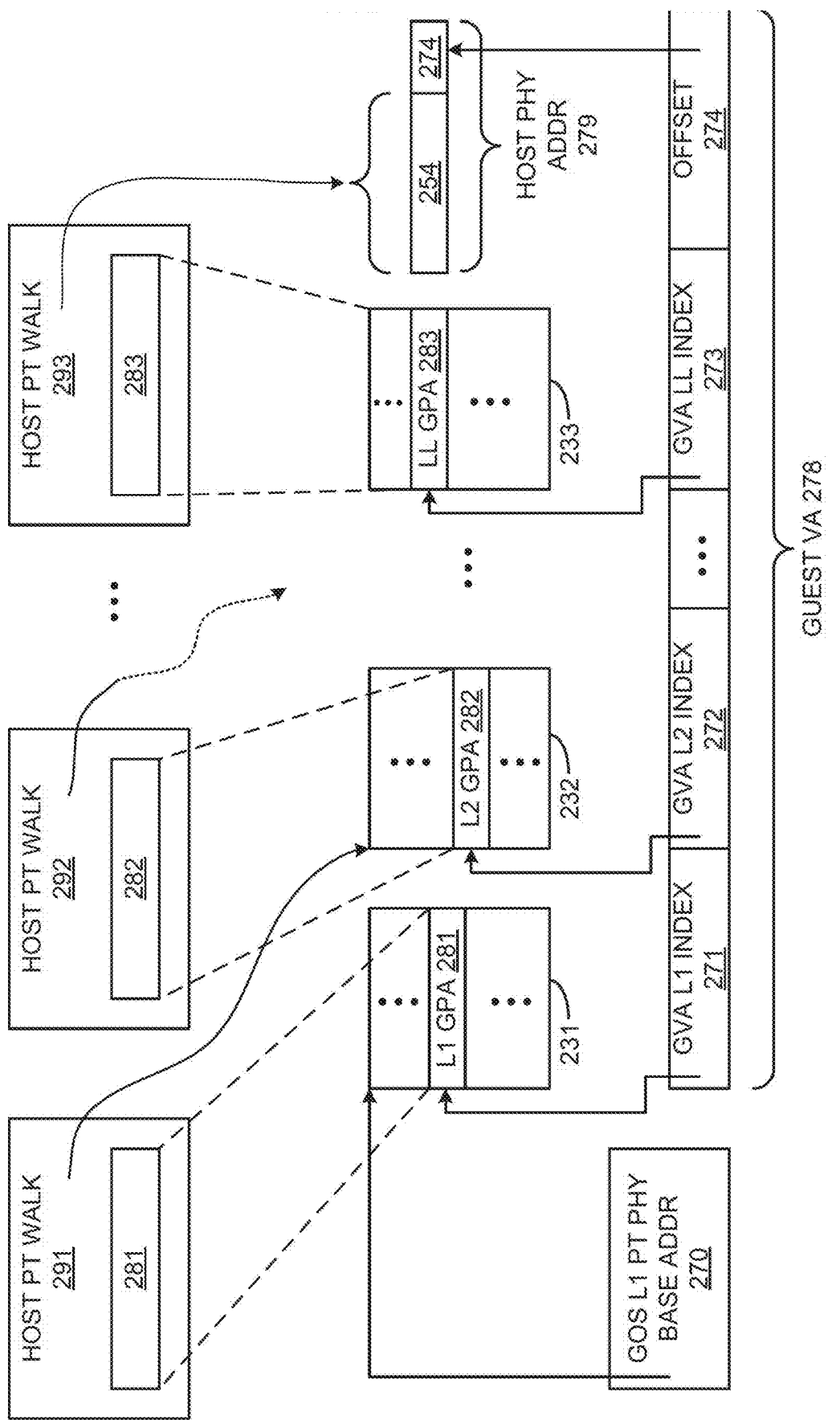

FIGS. 2A-2C illustrate managed and nested page table walks. FIG. 2A illustrates a 1-dimensional page table walk. The page table walk illustrated in FIG. 2A may be performed by, for example, host 100 running VMM 110 in a first mode. In FIG. 2A, guest VA 278 comprises guest VA level 1 index field 271, guest VA level 2 index field, additional index fields, guest VA last level index field 273, and offset field 274.

To translate guest VA 278 to host physical address 279, the value in guest VA level 1 index field 271 is used as an index into level 1 page table 241 that is pointed to by level 1 page table base address register 270. The host physical address 251 stored at the table location pointed to by guest VA level 1 index field 271 points to the level 2 page table 242. The value in guest VA level 2 index field 272 is used as an index into level 2 page table 242 that is pointed to by level 2 host physical address 251. The host physical address 252 stored at the table location pointed to by guest VA level 2 index field 272 points to the next level page table (not shown in FIG. 2A.) This pattern continues through all of the levels of the page table until the guest VA last level 273 serves as an index into last level page table 243. The host physical address 253 value stored at the table location pointed to by guest VA last level index field 273 provides the most-significant bits of host physical address 279. The remaining (least significant) bits of host physical address 279 are provided by the value in offset field 274.

FIGS. 2B-2C illustrate a 2-dimensional page table walk. The page table walk illustrated in FIGS. 2B-2C may be performed by, for example, host 100 running VMM 110 in a second mode. In FIGS. 2B-2C, guest VA 278 comprises guest VA level 1 index field 271, guest VA level 2 index field, additional index fields, guest VA last level index field 273, and offset field 274.

To translate guest VA 278 to host physical address 279, the value in guest VA level 1 index field 271 is used as an index into guest level 1 page table 231 that is pointed to by guest level 1 page table base address register 280. The guest physical address 281 stored at the table location pointed to by guest VA level 1 index field 271 is then translated into a host physical address 275 by host page table walk 291.

To translate guest PA 281 to host physical address 275, host page table walk 291 uses the value in guest PA level 1 index field 255 as an index into level 1 page table 221 that is pointed to by a page table base address register (not shown in FIGS. 2B-2C). The host physical address 261 stored at the table location pointed to by guest PA level 1 index field 255 points to the level 2 page table 222. The value in guest PA level 2 index field 256 is used as an index into level 2 page table 222 that is pointed to by level 2 host physical address 255. The host physical address 262 stored at the table location pointed to by guest PA level 2 index field 262 points to the next level page table (not shown in FIGS. 2B-2C.) This pattern continues through all of the levels of the page tables being walked by host page table walk 291 until the guest PA last level 257 serves as an index into last level page table 223. The host physical address 263 value stored at the table location pointed to by guest PA last level index field 257 provides the most-significant bits of host physical address 275. The remaining (least significant) bits of host physical address 275 are provided by the value in offset field 258.

Host physical address 275 points to the level 2 page table 232. The value in guest VA level 2 index field 272 is used as an index into level 2 page table 232 that is pointed to by host physical address 275. The guest physical address 282 stored at the table location pointed to by guest VA level 2 index field 272 is then translated into a host physical address by host page table walk 292. The host physical address pointed provided by page table walk 292 points to the next level page table (not shown in FIG. 2B-2C.) This pattern continues through all of the levels of the page table until the guest PA last level index field 273 serves as an index into last level page table 233. The guest physical address 283 value stored at the table location pointed to by guest VA last level index field 273 is translated by host page table walk 293 to provide the most-significant bits of host physical address 279. The remaining (least significant) bits of host physical address 279 are provided by the value in offset field 274.

From the foregoing, it should be appreciated that when using 2-dimensional page table walking, each field of guest VA 278 requires a host page table walk 291-293 and associated memory accesses. Thus, the number of memory accesses required when using 2-dimensional page table walking may be a significant multiple (e.g., 7) of the number of memory accesses required when using 1-dimensional page table walking.

Figure 3A:
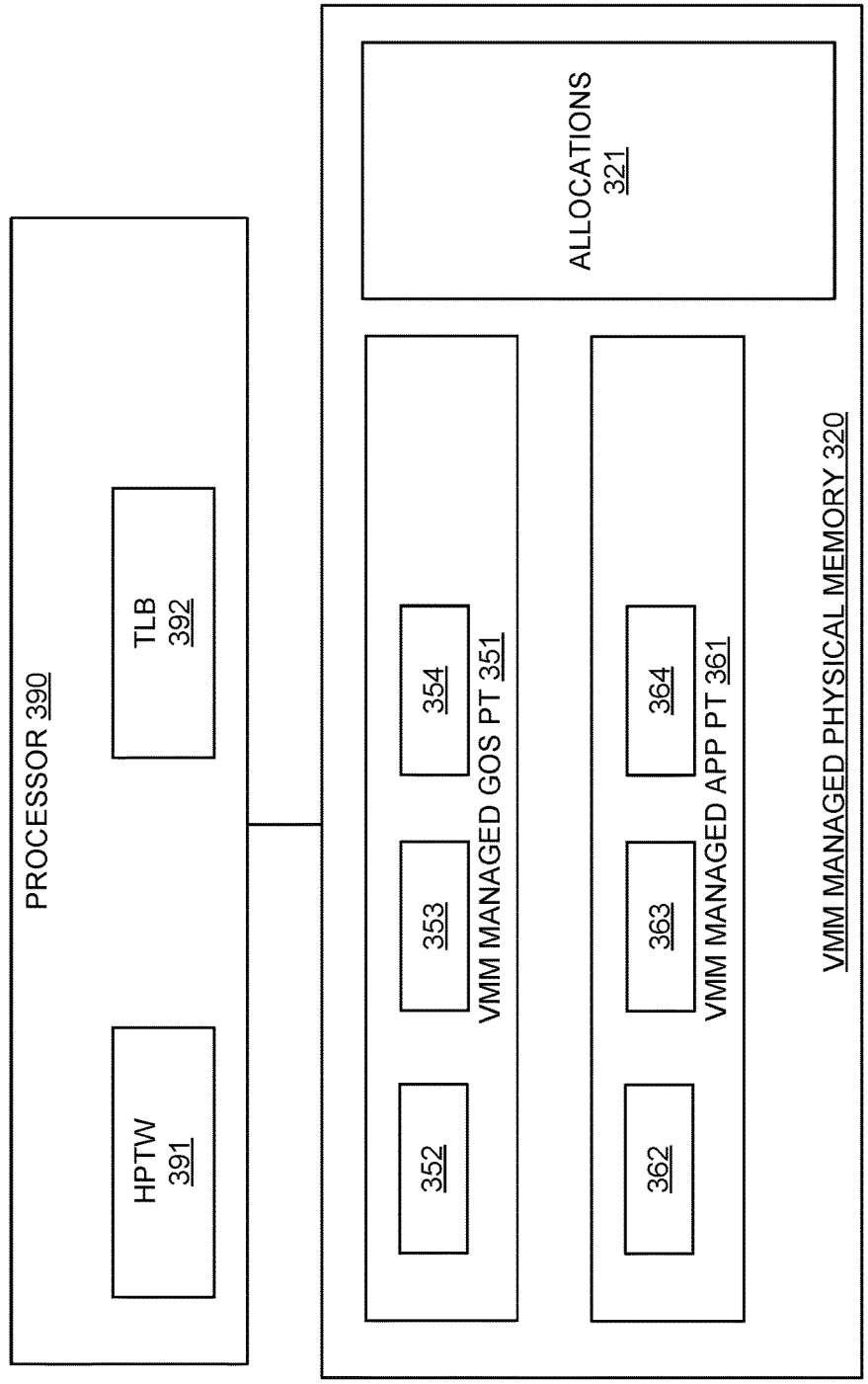
FIGS. 3A-3B are illustrations of a system with processor hardware page table walks.
Figure 3B:
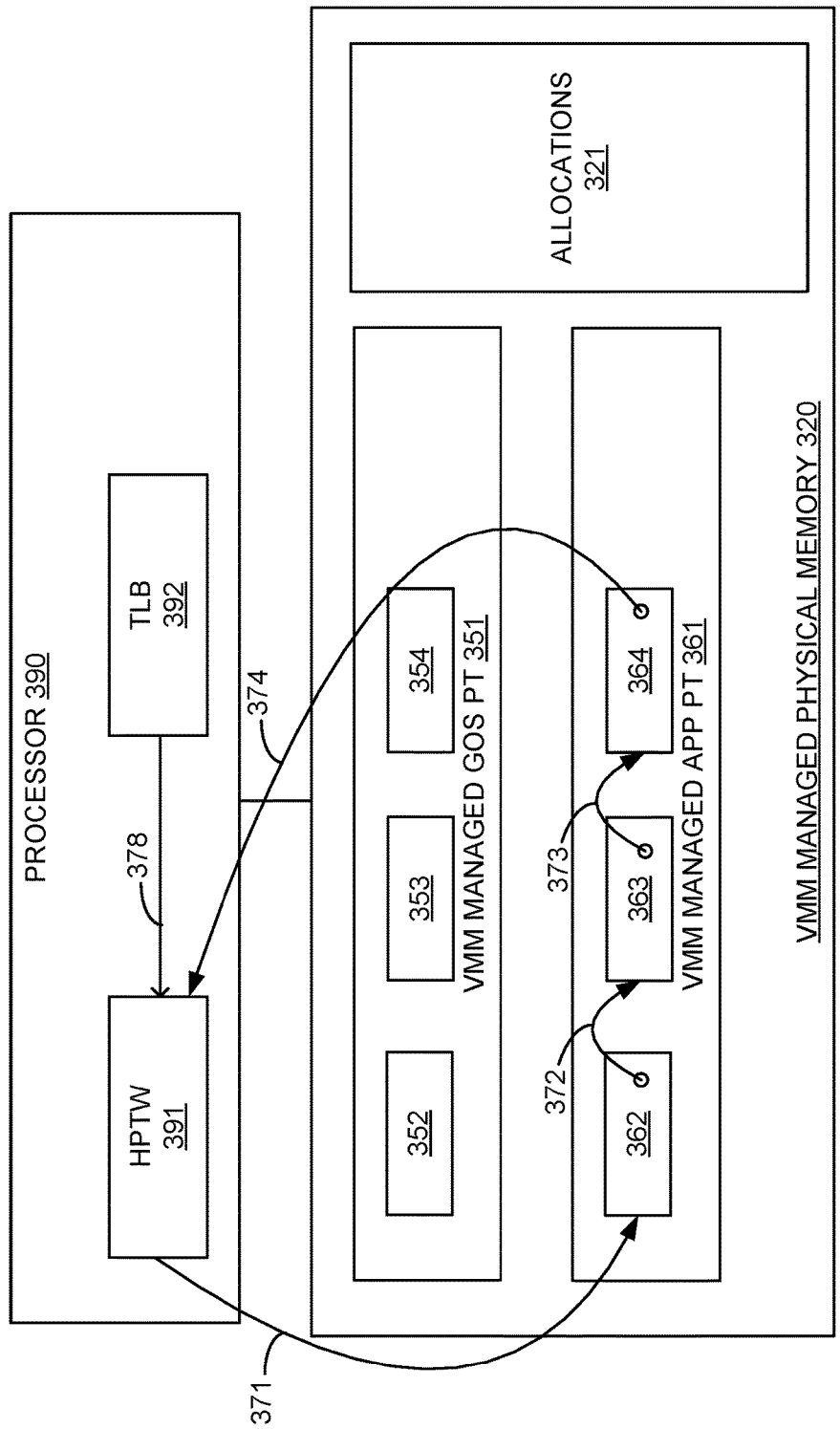

FIGS. 3A-3B are illustrations of a system with processor hardware page table walks. In FIGS. 3A-3B, system 300 comprises VMM managed physical memory 320 and processor 390. Processor 390 includes hardware page table walker 391 and translation lookaside buffer (TLB) 392. VMM managed physical memory 320 stores VMM managed guest operating system page table 351, VMM managed application page table 361, and memory allocations 321. VMM managed guest operating system page table 351 includes first level page table entry 352, second level page table entry 353, and last level page table entry 354. VMM managed application page table 361 includes first level page table entry 362, second level page table entry 363, and last level page table entry 364.

TLB 392 is a cache of virtual to physical address translations. Entries in TLB 392 are populated from entries in at least VMM managed guest operating system page table 351 and VMM managed application page table 361. TLB 392 is operatively coupled to hardware page table walker 391 to request page table walks (e.g., page table walks of VMM managed guest operating system page table 351 and/or VMM managed application page table 361) that result in translations of virtual addresses to physical addresses in VMM managed physical memory 320. One or more of these virtual address translations to physical addresses may be cached in TLB 392 so that future page table walks may be avoided.

Processor 390 is operatively coupled to VMM managed physical memory 320. Processor 390 is operatively coupled to VMM managed physical memory 320 to at least run a VMM managed guest operating system and guest operating system managed applications (not shown in FIGS. 3A-3B.) Processor 390 is also operatively coupled to VMM managed physical memory 320 to use VMM managed guest operating system page table 351 to at least translate at least one virtual address used by the guest operating system to a corresponding at least one physical address located in VMM managed physical memory 320, and allocations 321, in particular. Processor 390 is also operatively coupled to VMM managed physical memory 320 to use VMM managed application page table 361 to translate at least one application virtual address to a corresponding at least one physical addresses located in VMM managed physical memory 320, and allocations 321, in particular.

When an access by processor 390 is to a virtual address not cached in TLB 392, the virtual address may be provided to hardware page table walker 391. In response, hardware page table walker 391 accesses/walks the appropriate page table stored in VMM managed physical memory 320 in order to translate the virtual address into a physical address stored in VMM managed physical memory 320. This is illustrated in FIG. 3B by: virtual address 378 arrow running from TLB 392 to hardware page table walker 391; virtual address 371 arrow running from hardware page table walker 391 to first level page table entry 362; referencing arrow 372 running from first level page table entry 362 to second level page table entry 363; referencing arrow 373 running from second level page table entry 363 to last level page table entry 364; and, physical address 374 arrow running from last level page table entry 364 back to hardware page table walker 391. Hardware page table walker 391 may provide physical address 374 to TLB 392 for caching of the translation from virtual address 378 to physical address 374.

Figure 4:
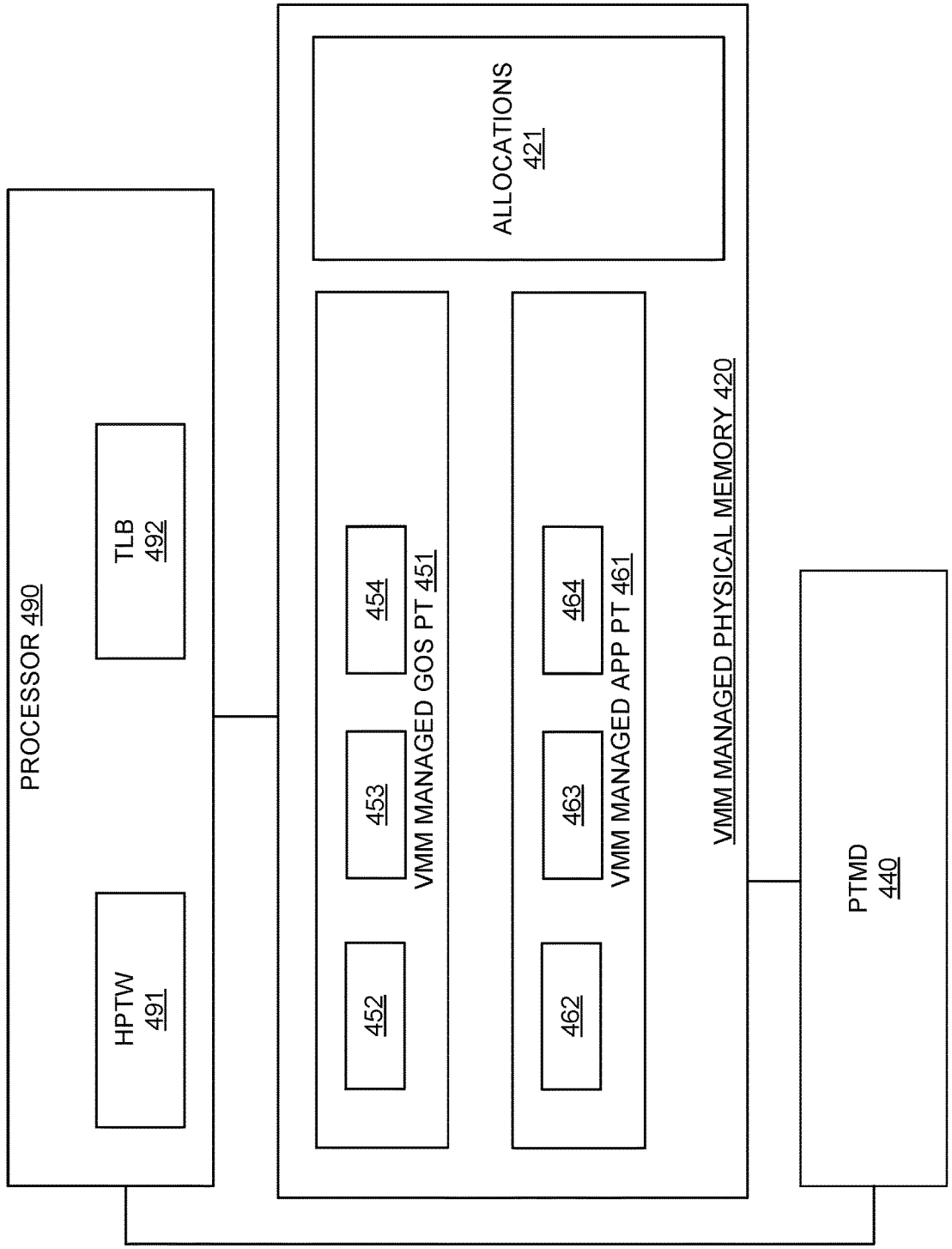
FIG. 4 is an illustration of a system with a page table management device.

FIG. 4 is an illustration of a system with a page table management device. In FIG. 4, system 400 comprises VMM managed physical memory 420, processor 490, and page table management device 440 (a.k.a., page table management accelerator). Processor 490 includes hardware page table walker 491 and translation lookaside buffer (TLB) 492. VMM managed physical memory 420 stores VMM managed guest operating system page table 451, VMM managed application page table 461, and memory allocations 421. VMM managed guest operating system page table 451 includes first level page table entry 452, second level page table entry 453, and last level page table entry 454. VMM managed application page table 461 includes first level page table entry 462, second level page table entry 463, and last level page table entry 464.

Processor 490 is operatively coupled to VMM managed physical memory 420 and page table management processor (PTMD) 440. Processor 490 is operatively coupled to VMM managed physical memory 420 to at least run a VMM managed guest operating system and guest operating system managed applications (not shown in FIG. 4). Processor 490 is also operatively coupled to VMM managed physical memory 420 to use VMM managed guest operating system page table 451 to at least translate at least one virtual address used by the guest operating system to a corresponding at least one physical address located in VMM managed physical memory 420, and allocations 421, in particular. Processor 490 is also operatively coupled to VMM managed physical memory 420 to use VMM managed application page table 461 to translate at least one application virtual address to a corresponding at least one physical addresses located in VMM managed physical memory 420, and allocations 421, in particular.

Page table management device 440 is operatively coupled to processor 490 and VMM managed physical memory 420. In an embodiment, PTMD 440 is operatively coupled to processor 490 and VMM managed physical memory 420 to offload at least a portion of the page table management tasks from a processor 490 executing the VMM. In an embodiment, the task of allocating physical memory and page table walks are done by processor 490 under the control of the VMM.

In an embodiment, a guest OS may indicate to the PTMD 440 what page tables to modify. This indication may be via a software call, a hardware call directly to the PTMD 440, and/or a software call to the VMM. The VMM allocates and reserves memory in VMM managed physical memory 420 for the PTMD 440 to use for creating and maintaining VMM managed guest operating system page table 451 and VMM managed application page table 461.

When the processor 490 (and hardware pate table walker 491, in particular) walks a page table that doesn't have a valid page table entry (i.e., there is no physical address associated with the page table entry) an on-demand allocation by VMM may occur. This may be the result of the invalid page table entry triggering a page fault in processor 490. In response, the VMM may: (1) select a physical address for a new page table entry; (2) indicate to PTMD 440 what that selected physical address is and which page table entry to update. In response, PTMD 440 creates the page table structure necessary in the indicated physical memory and/or updates the page table entry. When PTMD 440 has completed creating/updating the page table entry, the VMM returns from the page fault. Upon returning from the page fault, processor 490 completes the page table walk and retries the faulting instruction.

Thus, it should be understood that PTMD 440 and the VMM cooperate to manage the page tables in a unified manner while offloading at least some page table management tasks from both the guest OS(s) and the VMM to PTMD 440. The allocation of physical memory may be handled by the VMM and the page tables can still be walked by processor 490. The total number of memory references required to walk page table are reduced when compared to a system with nested page tables.

In an embodiment, the guest OS interfaces with PTMD 440 using a direct hardware interface between the guest OS and PTMD 440 to create, modify, delete, etc. page table 451, page table 461, and/or page table entries 452-454 462-464 such that the guest OS is not required to either allocate physical memory 420 and/or manage page table 451 and page table 461 by itself.

The VMM may allocate physical memory 420 as necessary during an on-demand allocation as a result of a page fault. The VMM may allocate a reserved portion of memory to PTMD 440 for the creation of the page tables themselves. The VMM would therefore not need to be in the path between the guest OS and PTMD 440 during creation, modification, deletion, etc. of page tables outside of allocation of physical memory 420 to virtual addresses.

This embodiment potentially allows the guest OS to use less processor 490 cycles managing memory and use hardware calls to request at least some of the page table management tasks be done by PTMD 440. In addition, the VMM may use less processor 490 cycles managing page tables—instead only managing the allocation of physical memory.

Figure 5A:
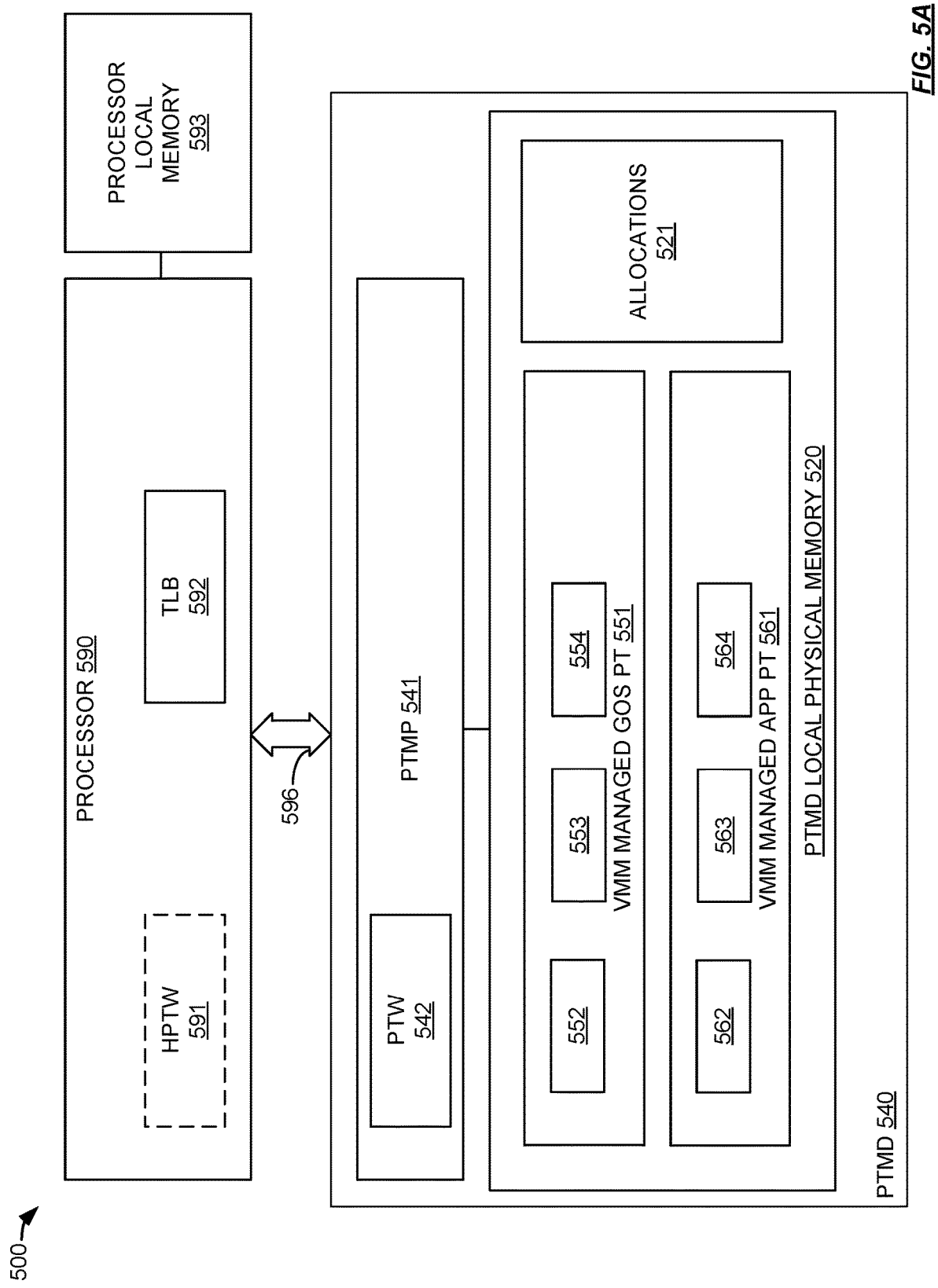
FIGS. 5A-5B are illustrations of a system with a page table management device.
Figure 5B:
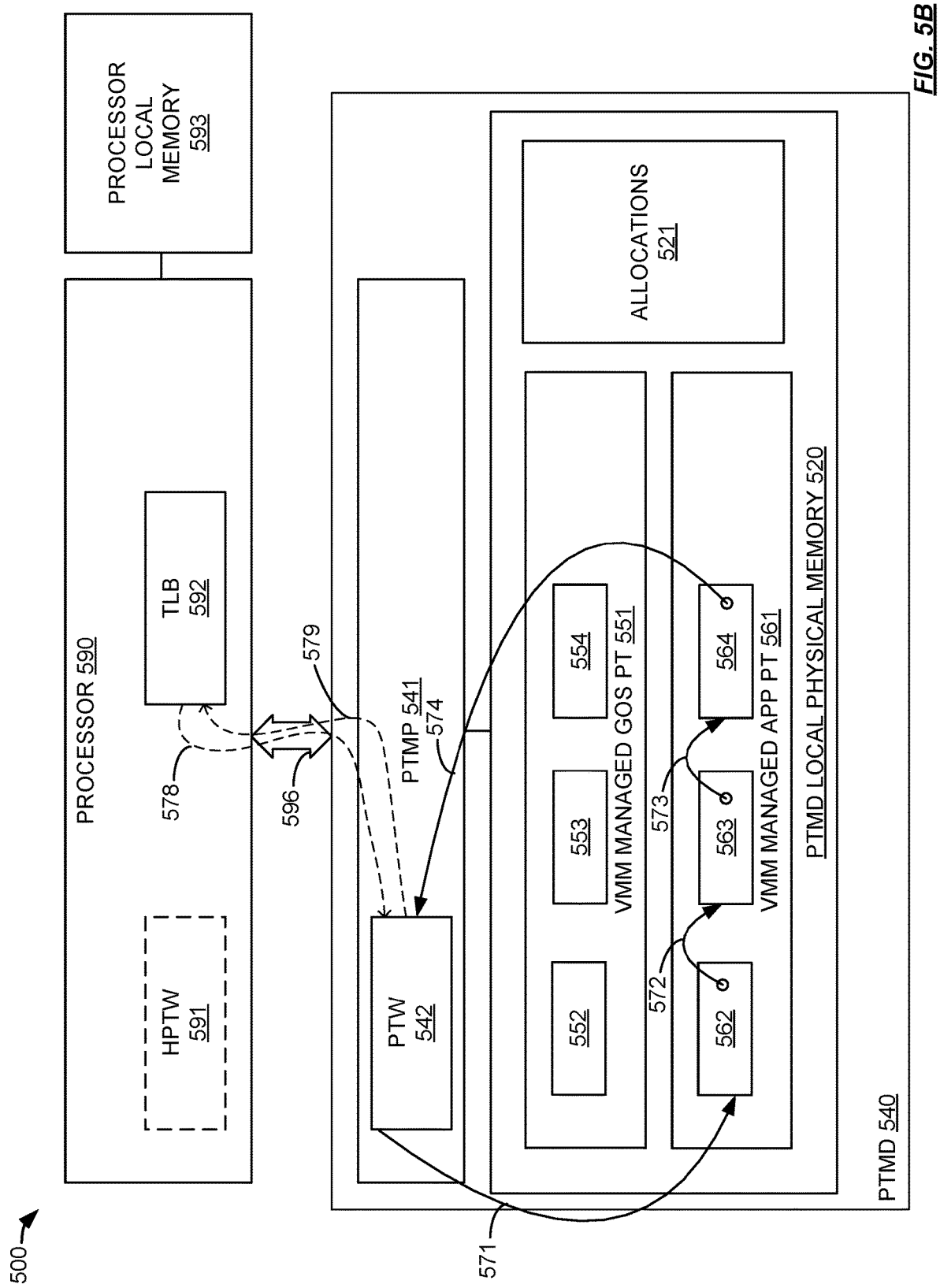

FIGS. 5A-5B are illustrations of a system with a page table management device. In FIGS. 5A-5B, system 500 comprises page table management device (PTMD) 540, processor 590, processor local memory 593, and coherent link 596. PTMD 540 includes page table management device local physical memory 520 and page table management processor (PTMP) 541. PTMP 541 includes page table walker 542. Processor 590 includes translation lookaside buffer (TLB) 592. Processor 590 may optionally include hardware page table walker 591. Processor 590 is operatively coupled to processor local memory 593 and page table management device 540. Processor 590 is operatively coupled to page table management device 540 via coherent link 596.

PTMD local physical memory 520 stores VMM managed guest operating system page table 551, VMM managed application page table 561, and memory allocations 521. VMM managed guest operating system page table 551 includes first level page table entry 552, second level page table entry 553, and last level page table entry 554. VMM managed application page table 561 includes first level page table entry 562, second level page table entry 563, and last level page table entry 564.

TLB 592 is a cache of virtual to physical address translations. Entries in TLB 592 are populated from entries in at least VMM managed guest operating system page table 551 and VMM managed application page table 561.

Processor 590 is operatively coupled to PTMD 540 via coherent link 596. Processor 590 is operatively coupled to PTMD 540 to request PTMP 541 (and page table walker 542, in particular) to use guest operating system page table 551 to at least translate at least one virtual address used by a guest operating system to a corresponding at least one physical address located in processor local memory 593, allocations 521, and/or another system node (not shown in FIGS. 5A-5B). Processor 590 is also operatively coupled to PTMD 540 to request PTMP 541 (and page table walker 542, in particular) to use application page table 561 to at least translate at least one virtual address used by an application to a corresponding at least one physical address located in processor local memory 593, allocations 521, and/or another system node (not shown in FIGS. 5A-5B).

When an access by processor 590 is to a virtual address not cached in TLB 592, processor 590 provides that address to PTMD 540 and indicates which of page table 551 and page table 561 to walk. In response, page table management processor 541 (and page table walker 542, in particular) accesses/walks the appropriate page table stored in PTMD local physical memory 520 in order to translate the virtual address into a physical address stored in processor local memory 593, allocations 521, and/or another system node (not shown in FIGS. 5A-5B). This is illustrated in FIG. 5B by: virtual address 578 arrow running from TLB 592 to page table walker 542 via coherent link 596; virtual address 571 arrow running from page table walker 542 to first level page table entry 562; referencing arrow 572 running from first level page table entry 562 to second level page table entry 563; referencing arrow 573 running from second level page table entry 563 to last level page table entry 564; and, physical address 574 arrow running from last level page table entry 564 to page table walker 542. PTMD 540 returns the physical address to processor 590 where it may be cached in TLB 592. This is illustrated in FIG. 5B by physical address arrow 579 running from page table walker 542 to TLB 592 via coherent link 596.

Figure 6A:
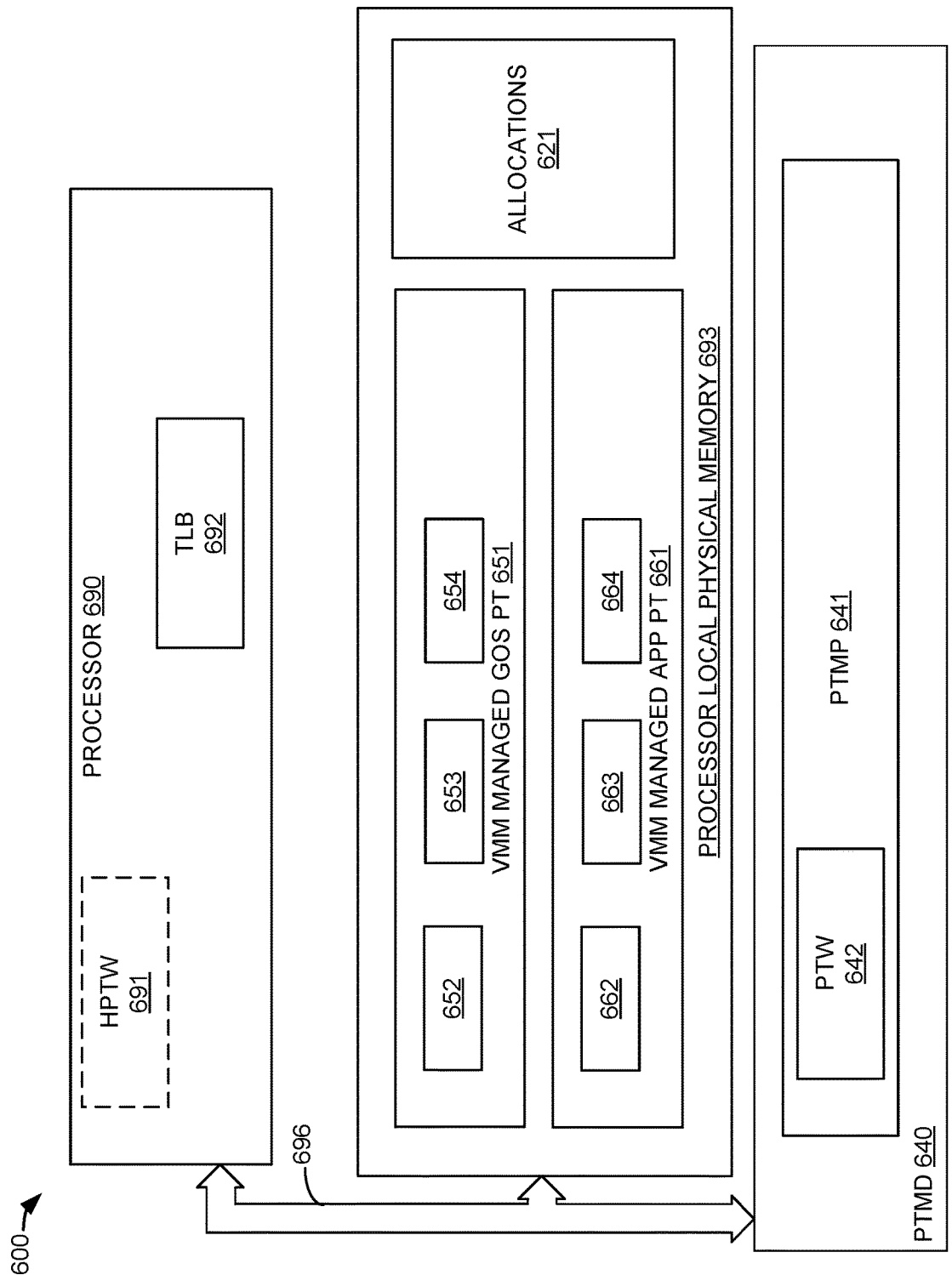
FIGS. 6A-6B are illustrations of a system with a page table management device.
Figure 6B:
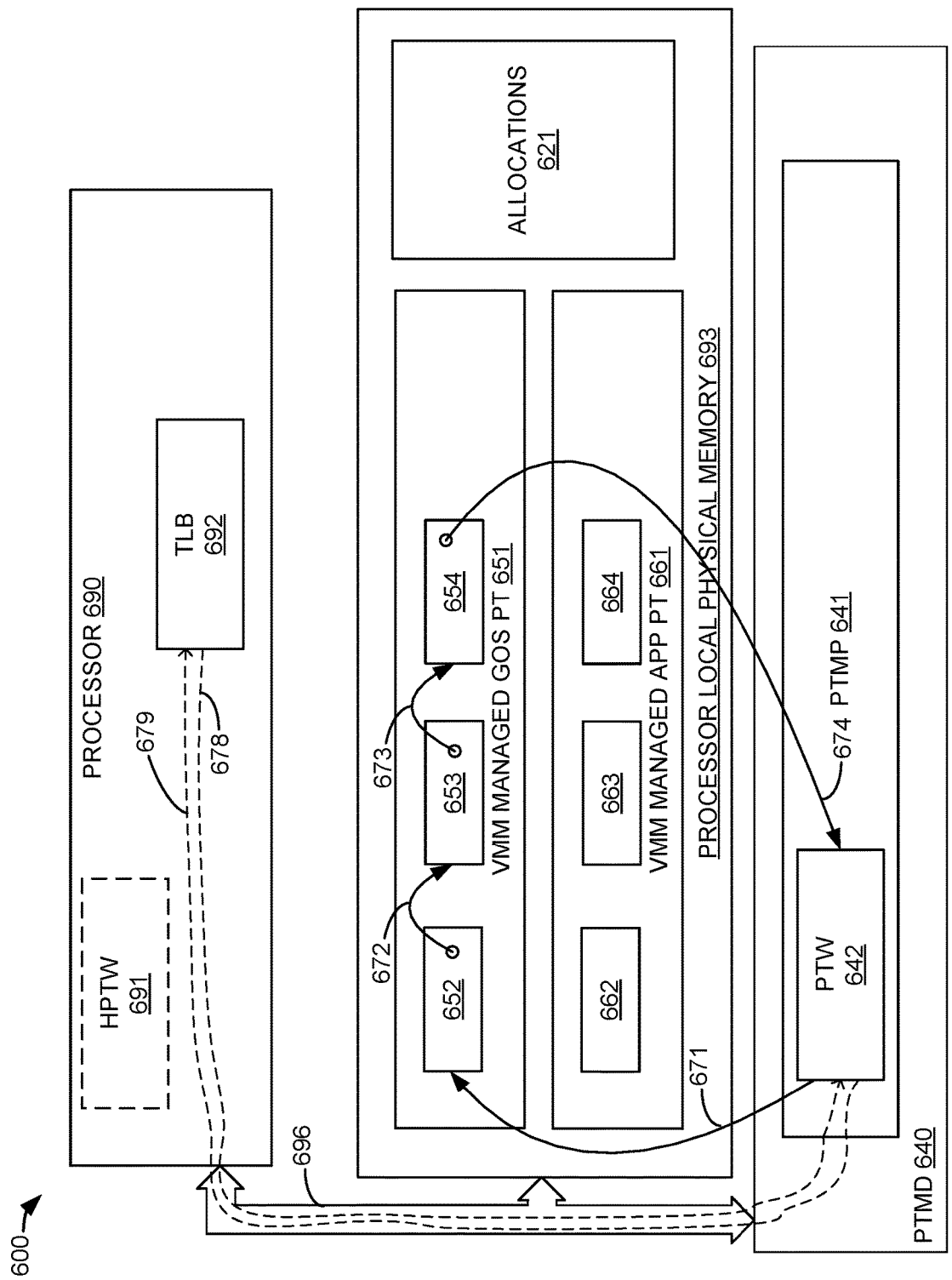

FIGS. 6A-6B are illustrations of a system with a page table management device. In FIGS. 6A-6B, system 600 comprises page table management device (PTMD) 640, processor 690, processor local memory 693, and coherent links 696. PTMD 640 includes page table management device and page table management processor (PTMP) 641. PTMP 641 includes page table walker 642. Processor 690 includes translation lookaside buffer (TLB) 692. Processor 690 may optionally include hardware page table walker 691. Processor 690 is operatively coupled to processor local memory 693 and page table management device 640 via coherent links 696.

Processor local physical memory 693 stores VMM managed guest operating system page table 651, VMM managed application page table 661, and memory allocations 621. VMM managed guest operating system page table 651 includes first level page table entry 652, second level page table entry 653, and last level page table entry 654. VMM managed application page table 661 includes first level page table entry 662, second level page table entry 663, and last level page table entry 664.

TLB 692 is a cache of virtual to physical address translations. Entries in TLB 692 are populated from entries in at least VMM managed guest operating system page table 651 and VMM managed application page table 661.

Processor 690 is operatively coupled to PTMD 640 via coherent links 696. Processor 690 is operatively coupled to PTMD 640 to request PTMP 641 (and page table walker 642, in particular) to use guest operating system page table 651 to at least translate at least one virtual address used by a guest operating system to a corresponding at least one physical address located in processor local memory 693, allocations 621, and/or another system node (not shown in FIGS. 6A-6B). Processor 690 is also operatively coupled to PTMD 640 to request PTMP 641 (and page table walker 642, in particular) to use application page table 661 to at least translate at least one virtual address used by an application to a corresponding at least one physical address located in processor local memory 693, allocations 621, and/or another system node (not shown in FIGS. 6A-6B).

When an access by processor 690 is to a virtual address not cached in TLB 692, processor 690 provides that address to PTMD 640 and indicates which of page table 651 and page table 661 to walk. In response, page table management processor 641 (and page table walker 642, in particular) accesses/walks the appropriate page table stored in PTMD local physical memory 620 in order to translate the virtual address into a physical address stored in processor local memory 693, allocations 621, and/or another system node (not shown in FIGS. 6A-6B). This is illustrated in FIG. 6B by: virtual address 678 arrow running from TLB 692 to page table walker 642 via coherent links 696; virtual address 671 arrow running from page table walker 642 to first level page table entry 652; referencing arrow 672 running from first level page table entry 652 to second level page table entry 653; referencing arrow 673 running from second level page table entry 653 to last level page table entry 654; and, physical address 674 arrow running from last level page table entry 654 to page table walker 642. PTMD 640 returns the physical address to processor 690 where it may be cached in TLB 692. This is illustrated in FIG. 6B by physical address arrow 679 running from page table walker 642 to TLB 692 via coherent links 696.

Figure 7:
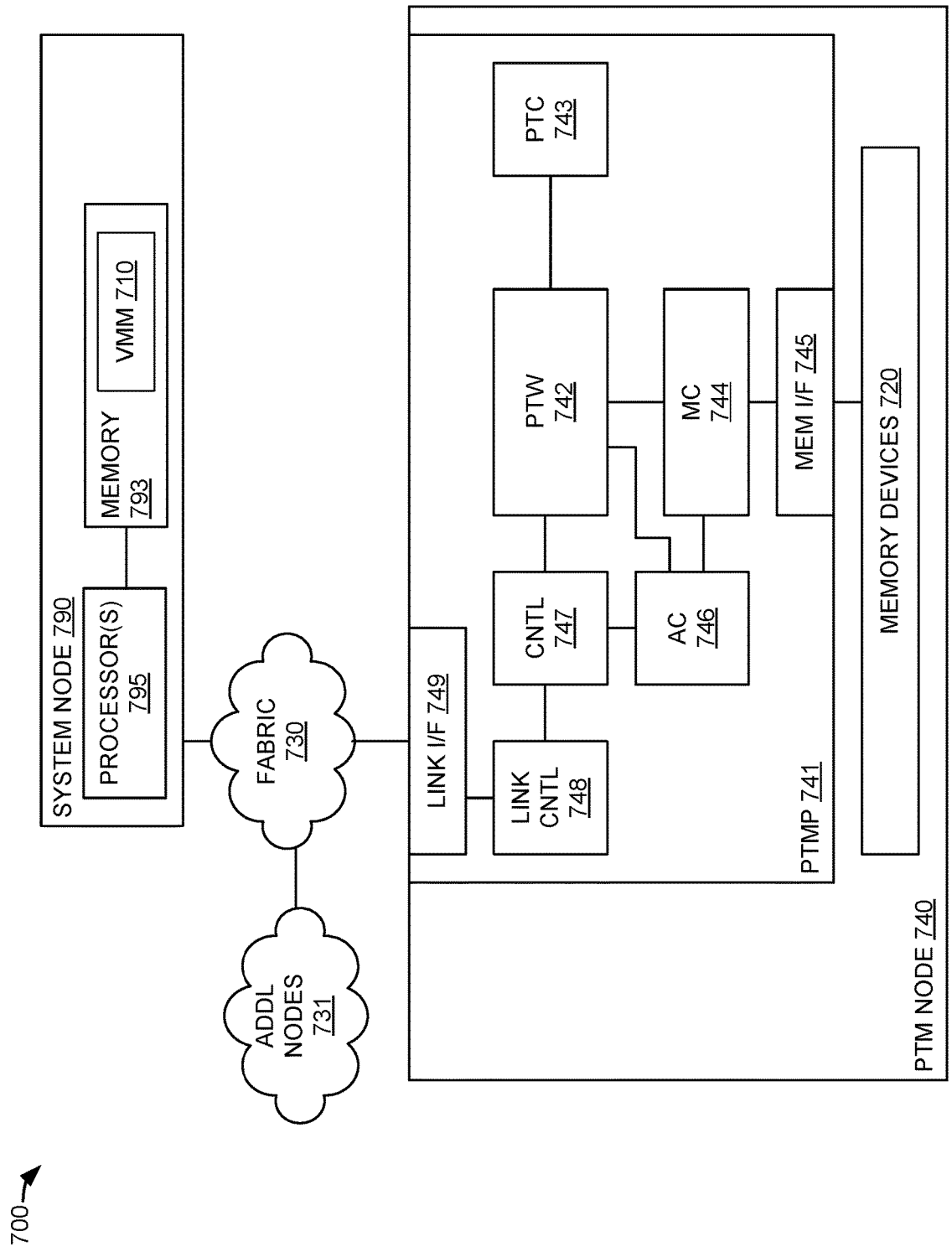
FIG. 7 is an illustration of a coherent fabric based system with a page table management engine.

FIG. 7 is an illustration of a coherent fabric based system with a page table management engine. In FIG. 7, system 700 comprises system node 790, fabric 730, additional nodes 731, and page table management (PTM) node 740. System node 790 includes processor(s) 795, and local processor memory 793. Local processor memory 793 stores a virtual machine manager 710 that is executing on one or more processors 795. PTM node 740 includes page table management processor (PTMP) 741, and memory devices 720.

System node 790, PTM node 740, and additional nodes 731 are operatively coupled to fabric 730. System node 790, PTM node 740, and additional nodes 731 are operatively coupled to fabric 730 to communicate and/or exchange information etc. with each other. Fabric 730 may be or comprise a switched fabric, point-to-point connections, and/or other interconnect architectures (e.g., ring topologies, crossbars, etc.) Fabric 730 may include links, linking, and/or protocols that are configured to be cache coherent. For example, fabric 730 may use links, linking, and/or protocols that include functionality described by and/or are compatible with one or more of Compute Express Link (CXL), Coherent Accelerator Processor Interface (CAPI), and Gen-Z standards, or the like. In an embodiment, System node 790, PTM node 740, and additional nodes 731 are operatively coupled to fabric 730 to request and/or store information from/to that resides within other of system node 790, PTM node 740, and/or additional nodes 731. In an embodiment, additional nodes 731 may include similar or the same elements as system node 790, and/or PTM node 740 and are therefore, for the sake of brevity, not discussed further herein with reference to FIG. 7.

As used herein, the descriptive term 'local' refers to whether accesses and/or communication between elements can be completed entirely within a node 790, 731, 740 without the use of fabric 730. The descriptive term 'remote' refers to whether accesses and/or communication between given elements cannot be completed entirely within a node 790, 731, 740 and therefore must use fabric 730 for accesses and/or communication. Thus, for example, memory 793 is local memory 793 with respect to processor 795 because processor 795 and memory 793 reside on the same system node 790. Conversely, for example, memory devices 720 are remote memory with respect to processor 795 because, since memory devices 720 are on PTM node 740, processor 795 must use fabric 730 to access and/or communicate with memory devices 720.

In an embodiment, PTMP includes page table walker (PTW) 742, page table cache 743, memory controller 744, memory interface 745, allocation control 746, control circuitry 747, link control 748, and link interface 749. Page table walker 742 is operatively coupled to page table cache 743, memory controller 744, allocation control 746, and control circuitry 747. Memory controller is operatively coupled to memory interface 745. Memory interface 745 is operatively coupled to memory device 720. Memory interface 745 is configured to access at least one of memory devices 720 to access at least one page table stored by memory devices 720.

Control circuitry 747 is operatively coupled to page table walker 742, allocation control 746 and link control 748. Link control 748 is operatively coupled to link interface 749. Link interface 749 is operatively coupled to fabric 730. Link interface 749 is operatively coupled to fabric 730 to receive, from processor 795 executing virtual machine manager 710, page table requests by virtual machine manager 710 to manage and access at least one page table. In an embodiment, the at least one page table managed by PTMP 741 is stored in local processor memory 793. In an embodiment, the at least one page table managed by PTMP 741 is stored in memory devices 720 that are local to PTM node 740. In an embodiment, two or more page tables managed by PTMP 741 may be stored in local processor memory 793, memory devices 720, or both.

Page table requests transmitted by system node 790 in response to virtual machine manager 710 may include page table creation, page table modification, and deletion of entries in a page table. In an embodiment, link interface 749 may receive a hardware call (e.g., TLB miss) from a processor 795 to perform a page table walk to relate a virtual address to a physical address. These hardware calls may be transmitted to PTM node 740 via fabric 730. In an embodiment, link interface 749 may receive requests that originate from VMM 710 to perform a page table walk to relate a virtual address to a physical address.

In response to requests received via link interface 749, PTMP may control page table walker 742 to receive a virtual address and walk a page table to relate the virtual address to a physical address. Once page table walker 742 completes the page table walk, PTMP may control link interface 749 to transmit the physical address to the requesting processor via fabric 730.

FIG. 8 is a flowchart illustrating a method of remote page table walking. One or more steps illustrated in FIG. 8 may be performed by, for example, host system 100, system 300, system 400, system 500, system 600, system 700, and/or their components. Via a first interface and from a remote processor executing a virtual machine manager, a request to convert a virtual address to a physical address is received (802). For example, PTM node 740 may receive, via link interface 749 and from processor 795 running VMM 710, a request to translate a virtual address (e.g., from a guest OS or application) to a physical address. In response to the request, a page table stored in a memory is walked (604). For example, in response to the request received from processor 795, PTMP 741 may use PTW 742 to walk a page table stored in memory device 720.

Figure 9:
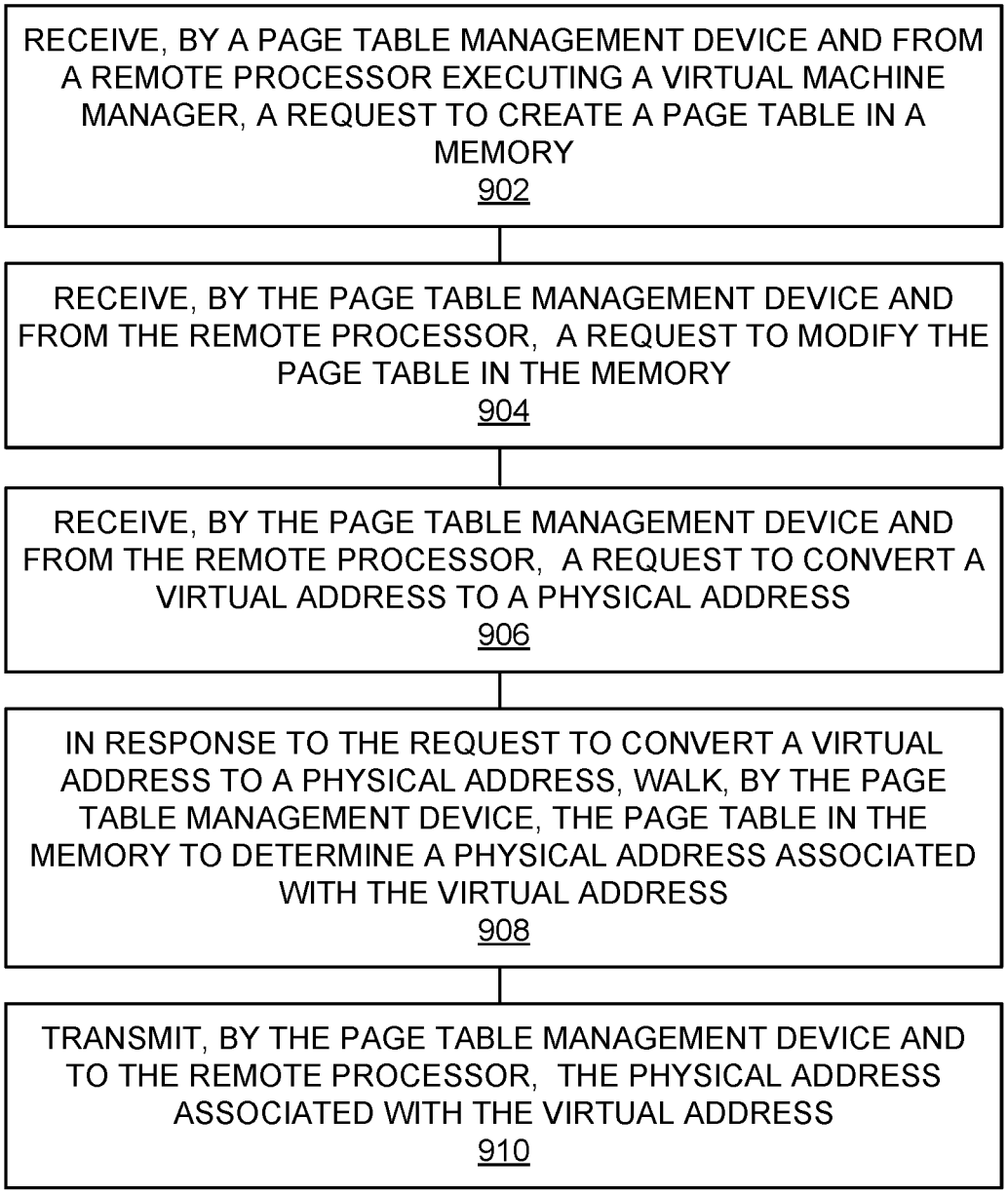
FIG. 9 is a flowchart illustrating a method of operating a page table management device.

FIG. 9 is a flowchart illustrating a method of operating a page table management device. One or more steps illustrated in FIG. 9 may be performed by, for example, host system 100, system 300, system 400, system 500, system 600, system 700, and/or their components. By a page table management device and from a remote processor executing a virtual machine manager, a request to create a page table in a memory is received (902). For example, PTM node 740 and PTMP 741, may receive, from processor 795 which is executing VMM 710, a request to create a page table in memory devices 720.

By the page table management device and from the remote processor, a request to modify the page table in the memory is received (904). For example, PTM node 740 and PTMP 741, may receive, from processor 795, a request to modify the page table in memory devices 720. By the page table management device and from the remote processor, a request to convert a virtual address to a physical address is received (906). For example, PTM node 740 and PTMP 741, may receive, from processor 795, a request to translate a virtual address to a physical address.

In response to the request to convert a virtual address to a physical address, the page table in the memory is walked, by the page table management device, to determine a physical address associated with the virtual address (908). For example, PTMP 741 may use page table walker 742 to walk the page table in memory devices 720 to find the physical address associated with the virtual address received from processor 795. The physical address associated with the virtual address is transmitted by the page table management device to the remote processor (910). For example, PTMP 741 may use link interface 749 to transmit, to processor 795, the physical address associated with the virtual address received from processor 795 that was found by page table walker 742.

FIG. 10 is a flowchart illustrating a method of operating a virtual machine manager. One or more steps illustrated in FIG. 10 may be performed by, for example, host system 100, system 300, system 400, system 500, system 600, system 700, and/or their components. By a virtual machine manager executing on a local processor, a command to translate a virtual address to a physical address is received (1002). For example, VMM 710 may receive, from processor 795, an indicator of a TLB miss and an associated virtual address that caused the TLB miss.

By the virtual memory manager and to a remote page table management device, a request to translate the virtual address to a physical address is transmitted (1004). For example, VMM 710 may cause processor 795 to transmit, to PTM node 740 and PTMP 741, in particular, a request to translate the virtual address that caused the TLB miss. The physical address associated with the virtual address is received by the virtual machine manager from the remote page table management device (1006). For example, VMM 710 executing on processor 795 may receive a response from PTMP 741 that includes the physical address associated with the virtual address transmitted to PTMP 741 and found by PTW 742. The physical address is provided by the virtual memory manager to the local processor (1008). For example, VMM 710 may provide to processor 795 the physical address associated with the virtual address that caused the TLB miss (e.g., as part of a TLB miss handling routine.)

The methods, systems and devices described above may be implemented in computer systems, or stored by computer systems. The methods described above may also be stored on a non-transitory computer readable medium. Devices, circuits, and systems described herein may be implemented using computer-aided design tools available in the art, and embodied by computer-readable files containing software descriptions of such circuits. This includes, but is not limited to one or more elements of host system 100, system 300, system 400, system 500, system 600, system 700, and their components. These software descriptions may be: behavioral, register transfer, logic component, transistor, and layout geometry-level descriptions. Moreover, the software descriptions may be stored on storage media or communicated by carrier waves.

Data formats in which such descriptions may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email. Note that physical files may be implemented on machine-readable media such as: 4 mm magnetic tape, 11 mm magnetic tape, 3½ inch floppy media, CDs, DVDs, and so on.

Figure 11:
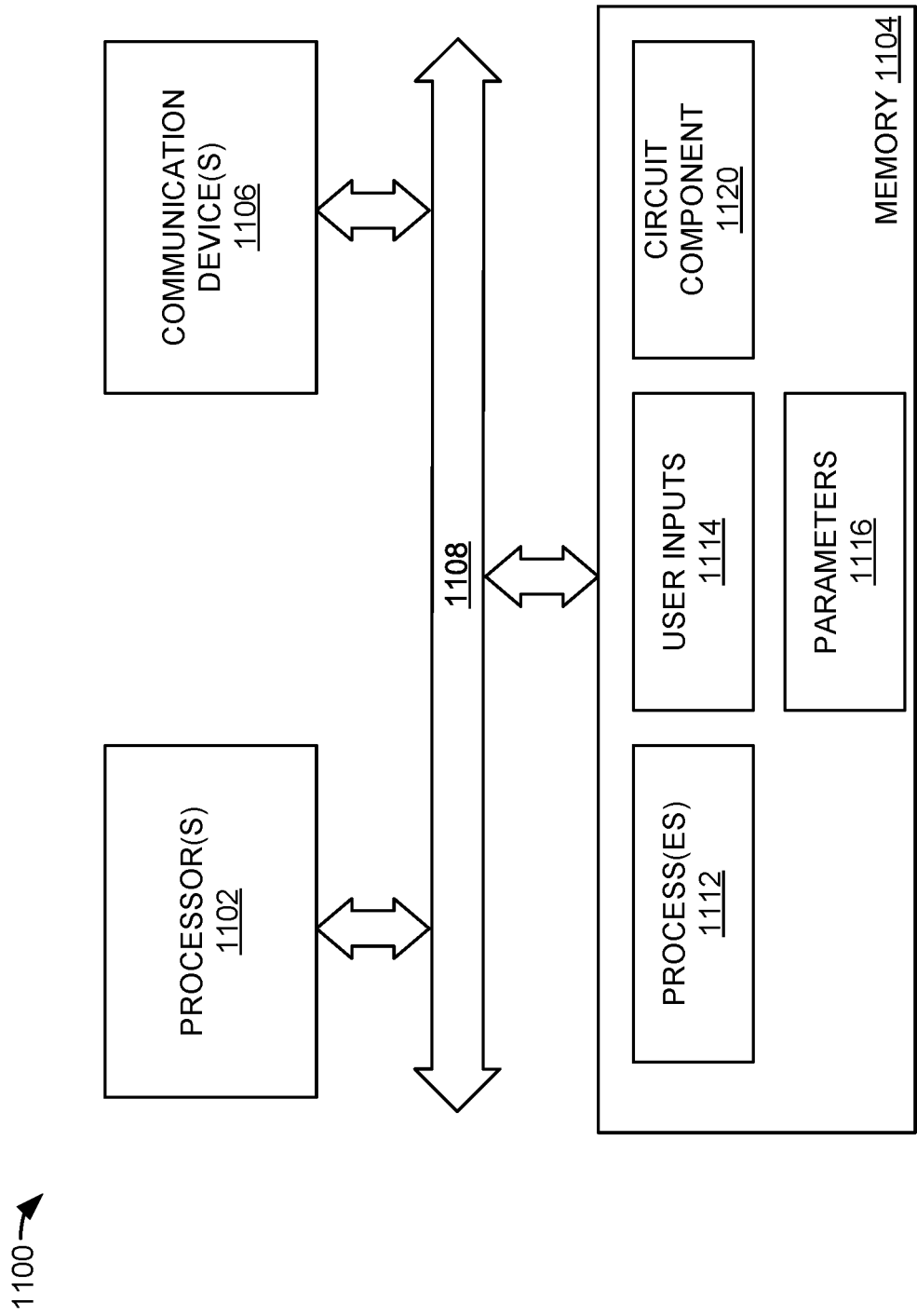
FIG. 11 is a block diagram illustrating a processing system.

FIG. 11 is a block diagram illustrating one embodiment of a processing system 1100 for including, processing, or generating, a representation of a circuit component 1120. Processing system 1100 includes one or more processors 1102, a memory 1104, and one or more communications devices 1106. Processors 1102, memory 1104, and communications devices 1106 communicate using any suitable type, number, and/or configuration of wired and/or wireless connections 1108.

Processors 1102 execute instructions of one or more processes 1112 stored in a memory 1104 to process and/or generate circuit component 1120 responsive to user inputs 1114 and parameters 1116. Processes 1112 may be any suitable electronic design automation (EDA) tool or portion thereof used to design, simulate, analyze, and/or verify electronic circuitry and/or generate photomasks for electronic circuitry. Representation 1120 includes data that describes all or portions of host system 100, system 300, system 400, system 500, system 600, system 700, and their components, as shown in the Figures.

Representation 1120 may include one or more of behavioral, register transfer, logic component, transistor, and layout geometry-level descriptions. Moreover, representation 1120 may be stored on storage media or communicated by carrier waves.

Data formats in which representation 1120 may be implemented include, but are not limited to: formats supporting behavioral languages like C, formats supporting register transfer level (RTL) languages like Verilog and VHDL, formats supporting geometry description languages (such as GDSII, GDSIII, GDSIV, CIF, and MEBES), and other suitable formats and languages. Moreover, data transfers of such files on machine-readable media may be done electronically over the diverse media on the Internet or, for example, via email.

User inputs 1114 may comprise input parameters from a keyboard, mouse, voice recognition interface, microphone and speakers, graphical display, touch screen, or other type of user interface device. This user interface may be distributed among multiple interface devices. Parameters 1116 may include specifications and/or characteristics that are input to help define representation 1120. For example, parameters 1116 may include information that defines device types (e.g., NFET, PFET, etc.), topology (e.g., block diagrams, circuit descriptions, schematics, etc.), and/or device descriptions (e.g., device properties, device dimensions, power supply voltages, simulation temperatures, simulation models, etc.).

Memory 1104 includes any suitable type, number, and/or configuration of non-transitory computer-readable storage media that stores processes 1112, user inputs 1114, parameters 1116, and circuit component 1120.

Communications devices 1106 include any suitable type, number, and/or configuration of wired and/or wireless devices that transmit information from processing system 1100 to another processing or storage system (not shown) and/or receive information from another processing or storage system (not shown). For example, communications devices 1106 may transmit circuit component 1120 to another system. Communications devices 1106 may receive processes 1112, user inputs 1114, parameters 1116, and/or circuit component 1120 and cause processes 1112, user inputs 1114, parameters 1116, and/or circuit component 1120 to be stored in memory 1104.

Implementations discussed herein include, but are not limited to, the following examples:

Example 1

A device, comprising: a first interface to receive, from at least one processor executing a virtual machine manager, page table requests by the virtual machine manager to manage and access a page table; and, a page table manager configured to perform the page table requests.

Example 2

The device of example 1, wherein the page table requests include page table creation, page table modification, and deletion of entries in the page table.

Example 3

The device of example 1, wherein the first interface further receives a hardware call from the processor to perform a page table walk to relate a virtual address to a physical address.

Example 4

The device of example 1, wherein the first interface further receives requests from the virtual machine manager to perform a page table walk to relate a virtual address to a physical address.

Example 5

The device of example 1, wherein the page table is stored in memory local to the processor.

Example 6

The device of example 1, further comprising: a second interface configured to access at least one memory device, the page table to be stored in the at least one memory device.

Example 7

The device of example 1, further comprising: a page table walker configured to receive a virtual address and walk the page table to relate the virtual address to a physical address, the physical address to be transmitted to the processor via the first interface.

Example 8

A device, comprising: a page table walker configured to receive a request to convert a virtual address to a physical address and to walk a page table to find the physical address associated with the virtual address; and, a first interface to receive the request from a processor executing a virtual machine manager.

Example 9

The device of example 8, further comprising: a page table manager configured to, in coordination with the virtual machine manager, perform at least one of page table creation, page table modification, page table entry deletion.

Example 10

The device of example 8, further comprising: a page table cache to store page table nodes comprising nodes from different levels of the page table.

Example 11

The device of example 8, wherein the request to convert the virtual address to the physical address is to be initiated by circuitry included in the processor.

Example 12

The device of example 8, wherein the request to convert the virtual address to the physical address is to be initiated by the virtual machine manager.

Example 13

The device of example 8, wherein the page table is stored in memory directly accessed by the processor.

Example 14

The device of example 8, wherein the page table is stored in memory indirectly accessed by the processor via at least one coherent link.

Example 15

A method, comprising: receiving, via a first interface and from a remote processor executing a virtual machine manager, a request to convert a virtual address to a physical address; and, in response to the request, walking a page table stored in a memory.

Example 16

The method of example 15, wherein the memory is local with respect to the remote processor.

Example 17

The method of example 16, further comprising: creating the page table in the memory; and, modifying the page table in the memory.

Example 18

The method of example 15, wherein the walking is performed by a page table walker coupled to the first interface.

Example 19

The method of example 18, wherein the memory is local with respect to the page table walker.

Example 20

The method of example 19, further comprising: creating the page table in the memory; and, modifying the page table in the memory.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A device, comprising:
   a first interface to receive, from at least one processor executing a virtual machine manager and via at least one coherent link, a plurality of page table requests generated by the virtual machine manager to manage and access a page table stored in a memory, the plurality of page table requests to include a page table walk request to convert a virtual address to a physical address, a page table creation request to create a page table in the memory, a page table modification request to modify a first page table entry in the memory, and a page table deletion request to delete a second page table entry in the memory; and,
   a page table management processor configured to receive the plurality of page table requests received via the first interface and to perform the plurality of page table requests including the page table walk request to convert the virtual address to the physical address.

2. The device of claim 1, wherein the page table walk request to convert a virtual address to a physical address is communicated via a hardware call.

3. The device of claim 1, wherein the memory is local to the at least one processor executing the virtual machine manager.

4. The device of claim 1, further comprising:
   a second interface configured to access the memory.

5. The device of claim 1, further comprising:
   a page table walker configured to receive the virtual address and walk the page table to relate the virtual address to the physical address, the physical address to be transmitted to the at least one processor via the first interface.

6. A device, comprising:
   a page table management processor configured to receive a first request to create a page table in a memory, a second request to modify a first page table entry in the memory, a third request to delete a second page table entry in the memory, and a fourth request convert a virtual address to a physical address and to, in response to the fourth request, perform a page table walk of the page table in the memory to find the physical address associated with the virtual address; and,
   a first interface to receive, via a coherent link, the first request, the second request, the third request, and the fourth request from a processor executing a virtual machine manager.

7. The device of claim 6, further comprising:
   a page table cache to store page table nodes comprising nodes from different levels of the page table.

8. The device of claim 6, wherein the fourth request is to be initiated by circuitry included in the processor.

9. The device of claim 6, wherein the fourth request is to be initiated by the virtual machine manager.

10. The device of claim 6, wherein the memory is directly accessed by the processor.

11. The device of claim 6, wherein the memory indirectly accessed by the processor via the coherent link.

12. A method, comprising:
    creating, by a page table management processor, a page table in a memory;
    modifying, by the page table management processor, the page table in the memory;
    receiving, via a first interface and a coherent link and from a remote processor executing a virtual machine manager, a request to convert a virtual address to a physical address; and,
    in response to the request and by a page table management processor coupled with the first interface, walking the page table stored in the memory.

13. The method of claim 12, wherein the memory is local with respect to the remote processor.

14. The method of claim 13, further comprising:
    deleting, by the page table management processor, a page table entry in the page table in the memory.

15. The method of claim 12, wherein the page table management processor comprises a page table walker and the walking is performed by the page table walker.

16. The method of claim 15, wherein the memory is local with respect to the page table management processor.

17. The method of claim 16, further comprising:
deleting, by the page table management processor, a page table entry in the page table in the memory.

* * * * *